(12) United States Patent
Cline et al.

(10) Patent No.: US 12,554,906 B2
(45) Date of Patent: Feb. 17, 2026

(54) LOW LATENCY AND HIGHLY PROGRAMMABLE INTERRUPT CONTROLLER UNIT

(71) Applicant: Intel Corporation, Santa Clara, CA (US)

(72) Inventors: Scott N. Cline, Portland, OR (US); Ivan B. Ganev, Portland, OR (US); Robert S. Pawlowski, Beaverton, OR (US); Jason Howard, Portland, OR (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 17/711,209

(22) Filed: Apr. 1, 2022

(65) Prior Publication Data

US 2022/0229795 A1    Jul. 21, 2022

Related U.S. Application Data

(60) Provisional application No. 63/295,280, filed on Dec. 30, 2021.

(51) Int. Cl.
*G06F 30/20* (2020.01)
*G06F 1/03* (2006.01)
(Continued)

(52) U.S. Cl.
CPC ............... *G06F 30/20* (2020.01); *G06F 1/03* (2013.01); *G06F 9/30101* (2013.01);
(Continued)

(58) Field of Classification Search
CPC ....... G06F 1/03; G06F 13/24; G06F 2209/521
See application file for complete search history.

(56) References Cited

U.S. PATENT DOCUMENTS

| | | | | |
|---|---|---|---|---|
| 6,038,661 | A | * | 3/2000 | Yoshioka ............ G06F 9/30101 712/E9.024 |
| 6,886,111 | B1 | * | 4/2005 | Tran .................... G06F 11/3696 717/124 |

(Continued)

OTHER PUBLICATIONS

PCT International Search Report and Written Opinion issued in PCT/US2022/050682, dated Mar. 31, 2023; 9 pages.

(Continued)

*Primary Examiner* — Henry Tsai
*Assistant Examiner* — Aurangzeb Hassan
(74) *Attorney, Agent, or Firm* — Alliance IP, LLC

(57) ABSTRACT

A graph processing core includes a plurality of processing pipelines and an interrupt controller unit. Each processing pipeline executes one or more threads and includes, for each thread, a register indicating a currently executing program counter vector and another register indicating an interrupt or exception handler vector. The interrupt controller unit may receive interrupt or exception notifications from the processing pipelines, determine a handler vector based on the notification and a set of registers of the interrupt controller unit, and transmit the handler vector to the processing pipeline that issued the interrupt or exception notification. Further, the issuing pipeline may receive the handler vector from the interrupt controller unit, write a value in the first register into the second register, write the handler vector into the first register, and invoke an interrupt or exception hander based on the value written into the first register.

23 Claims, 13 Drawing Sheets

(51) Int. Cl.
   *G06F 9/30* (2018.01)
   *G06F 9/38* (2018.01)
   *G06F 9/455* (2018.01)
   *G06F 9/52* (2006.01)
   *G06F 13/24* (2006.01)
   *G06F 30/18* (2020.01)

(52) U.S. Cl.
   CPC ............ *G06F 9/3851* (2013.01); *G06F 9/455* (2013.01); *G06F 9/52* (2013.01); *G06F 13/24* (2013.01); *G06F 30/18* (2020.01); *G06F 2209/521* (2013.01)

(56) References Cited

U.S. PATENT DOCUMENTS

| | | | |
|---|---|---|---|
| 10,713,045 B2 | 7/2020 | Jaffari et al. | |
| 11,003,606 B2 | 5/2021 | Birsan et al. | |
| 11,182,159 B2 | 11/2021 | Norrie et al. | |
| 2010/0293342 A1* | 11/2010 | Morfey | G06F 9/30167 |
| | | | 711/E12.001 |
| 2016/0011996 A1 | 1/2016 | Asaad et al. | |
| 2016/0291983 A1* | 10/2016 | Calhoun | G06F 9/4401 |
| 2020/0104164 A1* | 4/2020 | Pawlowski | G06F 9/3877 |
| 2021/0200904 A1* | 7/2021 | Guironnet De Massas | |
| | | | G06F 9/4812 |
| 2021/0389984 A1 | 12/2021 | Pawlowski et al. | |
| 2022/0222075 A1 | 7/2022 | Pawlowski et al. | |

OTHER PUBLICATIONS

Aananthakrishnan, Sriram, et al.; "PIUMA: Programmable Integrated Unified Memory Architecture," retrieved from the Internet at https://arxiv.org/abs/2010.06277; Oct. 13, 2020; 6 pages.

* cited by examiner

LOW LATENCY AND HIGHLY PROGRAMMABLE INTERRUPT CONTROLLER UNIT

RELATED APPLICATIONS

This application claims benefit to U.S. Provisional Patent Application Ser. No. 63/295,280, filed Dec. 30, 2021, which is incorporated by reference herein in its entirety.

STATEMENT REGARDING FEDERALLY SPONSORED RESEARCH AND DEVELOPMENT

This invention was made with Government support under Agreement No. HR0011-17-3-0004, awarded by the Defense Advanced Research Projects Agency (DARPA). The Government has certain rights in the invention.

BACKGROUND

A datacenter may include one or more platforms each including at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications.

BRIEF DESCRIPTION OF THE DRAWINGS

Like reference numbers and designations in the various drawings indicate like elements.

DETAILED DESCRIPTION

Figure 1:
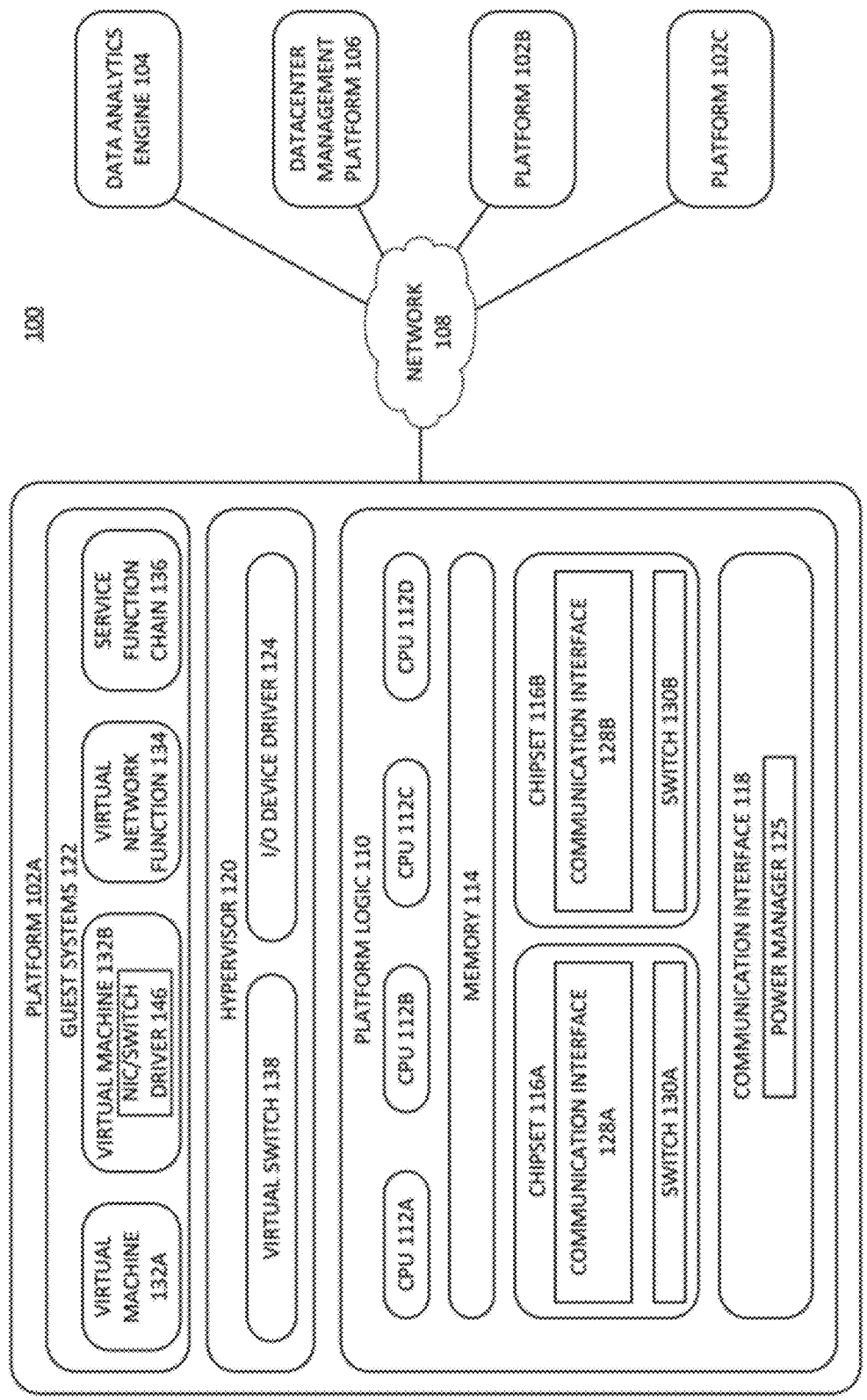
FIG. 1 illustrates a block diagram of components of an example datacenter.

FIG. 1 illustrates a block diagram of components of a datacenter 100 in accordance with certain embodiments. In the embodiment depicted, datacenter 100 includes a plurality of platforms 102 (e.g., 102A, 102B, 102C, etc.), data analytics engine 104, and datacenter management platform 106 coupled together through network 108. A platform 102 may include platform logic 110 with one or more central processing units (CPUs) 112 (e.g., 112A, 112B, 112C, 112D), memories 114 (which may include any number of different modules), chipsets 116 (e.g., 116A, 116B), communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

Each platform 102 may include platform logic 110. Platform logic 110 includes, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that includes multiple platforms coupled together through network 108 (which may include, e.g., a rack or backplane switch).

CPUs 112 may each include any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removably coupled to platform 102. CPU 112 is described in further detail below in connection with FIG. 4. Although four CPUs are shown, a platform 102 may include any suitable number of CPUs.

Memory 114 may include any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also include storage for instructions that may be executed by the cores of CPUs 112 or other processing elements (e.g., logic resident on chipsets 116) to provide functionality associated with components of platform logic 110. Additionally or alternatively, chipsets 116 may each include memory that may have any of the characteristics described herein with respect to memory 114. Memory 114 may also store the results and/or intermediate results of the various calculations and determinations performed by CPUs 112 or processing elements on chipsets 116. In various embodiments, memory 114 may include one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 including any suitable logic to support the operation of the CPUs 112. In some cases, chipsets 116 may be implementations of graph processing devices, such as discussed herein. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via one or more integrated I/O controllers resident on each CPU.

Chipsets 116 may each include one or more communication interfaces 128 (e.g., 128A, 128B). Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130 (e.g., 130A, 130B)) and another device coupled to network 108. In some embodiments, network 108 may include a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (i.e., software) switch.

Platform logic 110 may include an additional communication interface 118. Similar to communication interface 128, this additional communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 includes one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may include a processor core interrupt; a request to instantiate a software component, such as an I/O device driver 124 or virtual machine 132 (e.g., 132A, 132B); a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may include a single virtual machine (e.g., virtual machine 132A or 132B) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132B may be paravirtualized. For example, the virtual machine 132B may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may include a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining 136 may provide the ability to define an ordered list of network services (e.g. firewalls, load balancers) that are stitched together in the network to create a service chain.

A hypervisor 120 (also known as a virtual machine monitor) may include logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may include a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may include a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g.

cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may include any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can include any number of hardware or software elements coupled to (and in communication with) each other through a communications medium. In various embodiments, guest systems 122 may communicate with nodes that are external to the datacenter 100 through network 108.

Current practices in data analytics and artificial intelligence perform tasks such as object classification on unending streams of data. Computing infrastructure for classification is predominantly oriented toward "dense" compute, such as matrix computations. The continuing exponential growth in generated data has shifted some compute to be offloaded to GPUs and other application-focused accelerators across multiple domains that are dense-compute dominated. However, the next step in the evolution in both artificial intelligence (AI), machine learning, and data analytics is reasoning about the relationships between these classified objects. In some implementations, a graph structure (or data structure) may be defined and utilized to define relationships between classified objects. For instance, determining the relationships between entities in a graph is the basis of graph analytics. Graph analytics poses important challenges on existing processor architectures due to its sparse structure.

High-performance large scale graph analytics is essential to timely analyze relationships in big data sets. The combination of low performance and very large graph sizes has traditionally limited the usability of graph analytics. Indeed, conventional processor architectures suffer from inefficient resource usage and bad scaling on graph workloads. Recognizing both the increasing importance of graph analytics and the need for vastly improved sparse computation performance compared to traditional approaches, an improved system architecture is presented herein that is adapted to performing high-performance graph processing by addressing constraints across the network, memory, and compute architectures that typically limit performance on graph workloads.

Figure 2A:
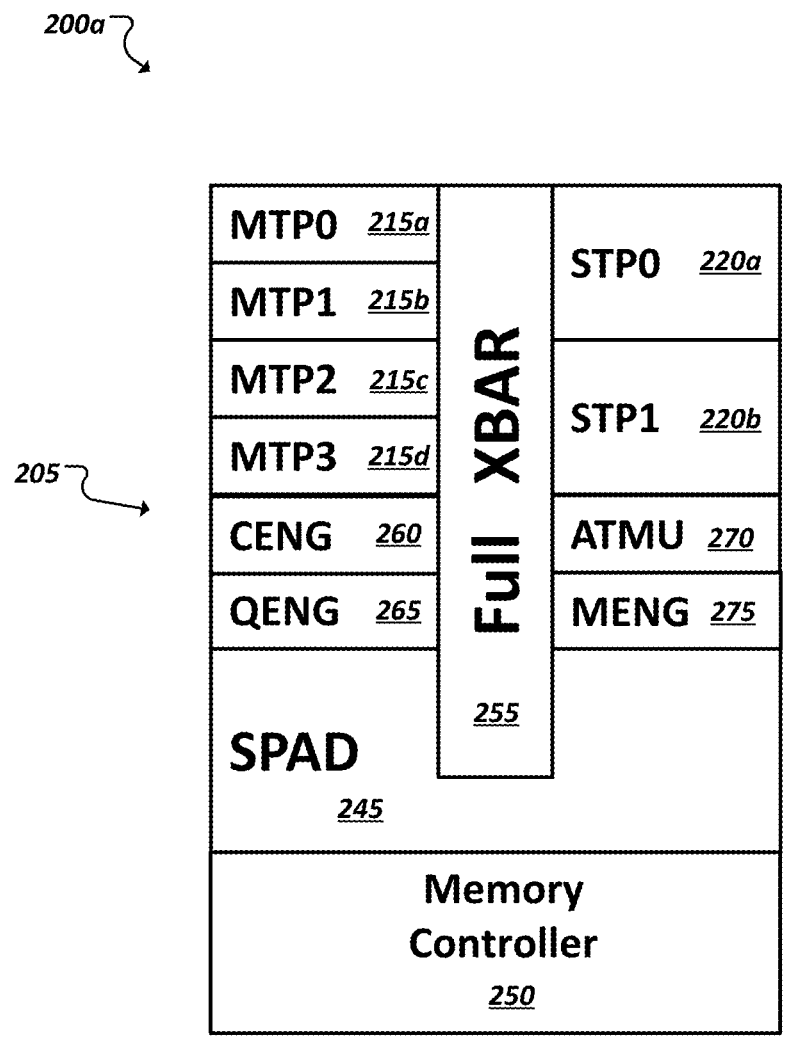
FIG. 2A is a simplified block diagram illustrating an example graph processing core.

FIG. 2A is a simplified block diagram 200a representing the general architecture of an example graph processing core 205. While a graph processing core 205, as discussed herein, may be particularly adept, at an architectural level, at handling workloads to implement graph-based algorithms, it should be appreciated that the architecture of a graph processing core 205 may handle any program developed to utilize its architecture and instruction set, including programs entirely unrelated to graph processing. Indeed, a graph processing core (e.g., 205) may adopt an architecture configured to provide massive multithreading and enhanced memory efficiency to minimize latency to memory and hide remaining latency to memory. Indeed, the high input/output (I/O) and memory bandwidth of the architecture enable the graph processing core 205 to be deployed in a variety of applications where memory efficiency is at a premium and memory bandwidth requirements made by the application are prohibitively demanding to traditional processor architectures. Further, the architecture of the graph processing core 205 may realize this enhanced memory efficiency by granularizing its memory accesses in relatively small, fixed chunks (e.g., 8B random access memory), equipping the cores with networking capabilities optimized for corresponding small transactions, and providing extensive multithreading.

In the example of FIG. 2A, an example graph processing core 205 may include a number of multi-threaded pipelines or cores (MTCs) (e.g., 215a-d) and a number of single-threaded pipelines or cores (e.g., 220a-b). In some implementations, the MTCs and STCs may architecturally the same, but for the ability of the MTCs to support multiple concurrent threads and switching between these threads. For instance, respective MTC and STC may have 32 registers per thread, all state address map, and utilize a common instruction set architecture (ISA). In one example, the pipeline/core ISAs may be Reduced Instruction Set Computer (RISC)-based, fixed length instructions.

In one example, respective MTC (e.g., 215a-d) may support sixteen threads with only minimal interrupt handling. For instance, each thread in an MTC may execute a portion of a respective instruction, with the MTC switching between the active threads automatically or opportunistically (e.g., switch from executing one thread to the next in response to a load operation by the first thread so as to effectively hide the latency of the load operation (allowing the other thread or threads to operate during the cycles needed for the load operation to complete), among other examples). An MTC thread may be required to finishing executing its respective instruction before taking on another. In some implementations, the MTCs may adopt a barrel model, among other features or designs. STC's may execute a single thread at a time and may support full interrupt handling. Portions of a workload handled by a graph processing core 205 may be divided not only between the MTCs (e.g., with sixteen threads per MTC), but also between the MTCs 215a-d and STCs 220a-b. For instance, STCs 220a-b may be optimized for various types of operations (e.g., load-store forwarding, branch predictions, etc.) and programs may make use of STCs for some operations and the multithreading capabilities of the MTCs for other instructions.

An example graph processing core 205 may include additional circuitry to implement components such as a scratchpad 245, uncore, and memory controller (e.g., 250). Components of the graph processing core 205 may be interconnected via a crossbar interconnect (e.g., a full crossbar 255) that ties all components in the graph processing core 205 together in a low latency, high bandwidth network. The memory controller 250 may be implemented as a narrow channel memory controller, for instance, supporting a narrow, fixed 8-byte memory channel. Data pulled using the memory controller from memory in the system may be loaded into a scratchpad memory region 245 for use by other components of the graph processing core 205. In one example, the scratchpad may provide 2 MB of scratchpad memory per core (e.g., MTC and STC) and provide dual network ports (e.g., via 1 MB regions).

In some implementations, an uncore region of a graph processing core 205 may be equipped with enhanced functionality to allow the MTCs 215*a-d* and STCs 220*a-b* to handle exclusively substantive, algorithmic workloads, with supporting work handled by the enhanced uncore, including synchronization, communication, and data movement/migration. The uncore may perform a variety of tasks including copy and merge operations, reductions, gathers/scatters, packs/unpacks, in-flight matrix transposes, advanced atomics, hardware collectives, reductions in parallel prefixes, hardware queuing engines, and so on. The ISA of the uncore can come from the pipelines' (MTCs and STCs) synchronous execution. In one example, the uncore may include components such as a collective engine 260, a queue engine 265, an atomic engine 270, and memory engine 275, among other example components and corresponding logic. An example memory engine 275 may provide an internal DMA engine for the architecture. The queue engine 265 can orchestrate and queue messaging within the architecture, with messages optimized in terms of (reduced) size to enable very fast messaging within the architecture. An example collective engine 260 may handle various collective operations for the architecture, including reductions, barriers, scatters, gathers, broadcasts, etc. The atomic engine 270 may handle any memory controller lock scenarios impacting the memory controller 250, among other example functionality.

Figure 2B:
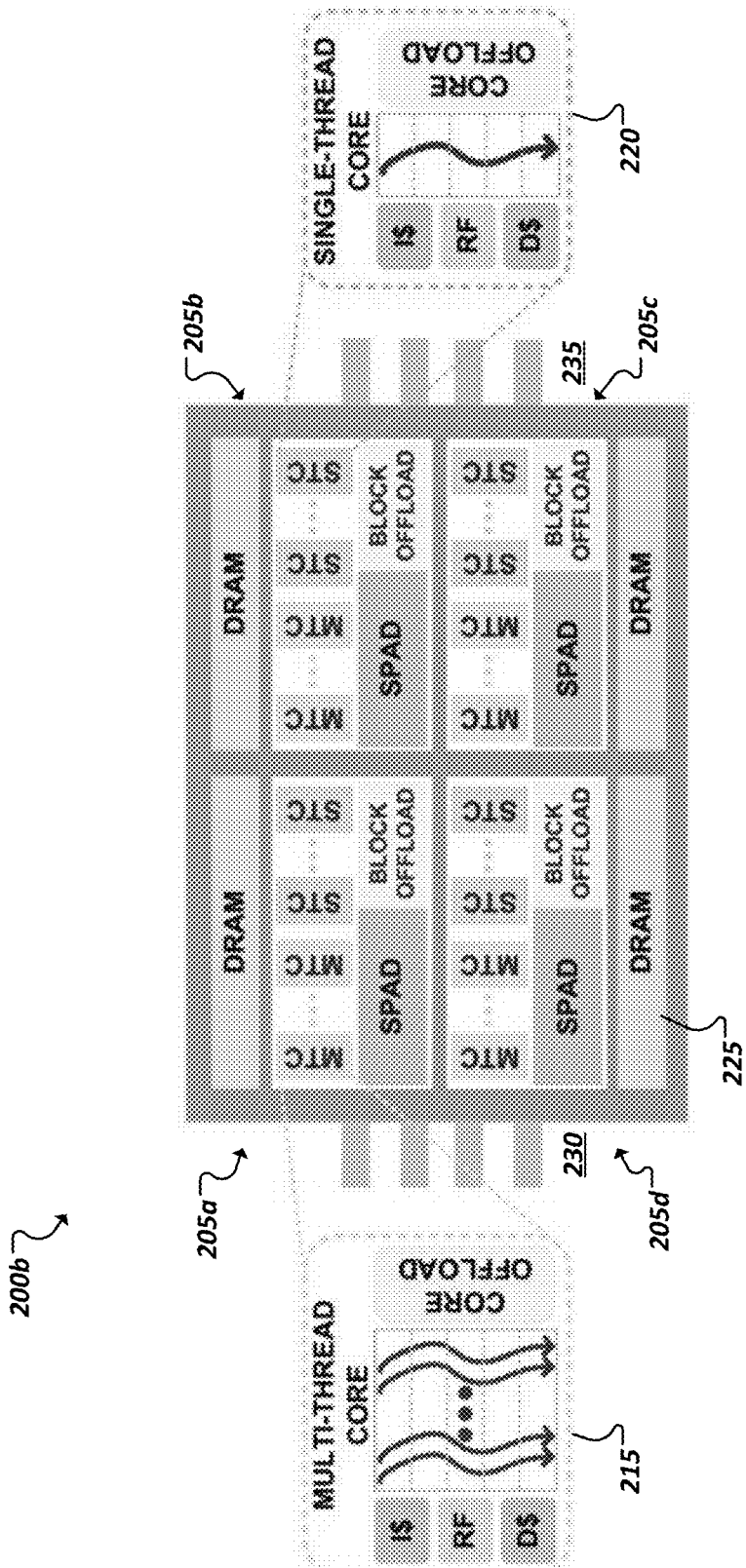
FIG. 2B is a simplified block diagram illustrating an example graph processing device.

FIG. 2B is a simplified block diagram illustrating an example system 200*b* with a set of graph processing cores 205*a-d*. A graph processing node may include a respective graph processing core (e.g., 205*a-d*) and a corresponding memory (e.g., dynamic random access memory (DRAM) (e.g., 225)). Each node may include a respective graph processing core (e.g., 205), which includes a set of MTCs (e.g., 215) as well as a set of single-thread cores (STCs) (e.g., 220), such as in the example graph processing core 205 illustrated and described above in the example of FIG. 2A. In one example, multiple graph processing nodes may be incorporated in or mounted on the same package or board and interconnected via a high-radix (e.g., multiple (e.g., >3) ports per connection), low-diameter (e.g., of 3 or less) network. The example system 200 may further include interconnect ports (e.g., 230, 235) to enable the system 200 to be coupled to other computing elements including other types of processing units (e.g., central processing units (CPUs), graphical processing units (GPUs), tensor processing units (TPUs), etc. In some cases, a graph processing chip, chiplet, board, or device (e.g., system 200) may be coupled to other graph processing devices (e.g., additional instances of the same type of graph processing system (e.g., 200). In some implementations, interconnects 230, 235 may be utilized to couple to other memory devices, allowing this external memory and local DRAM (e.g., 225) to function as shared system memory of the graph processing nodes for use by graph processing cores and other logic of the graph processing nodes, among other examples.

Figure 3A:
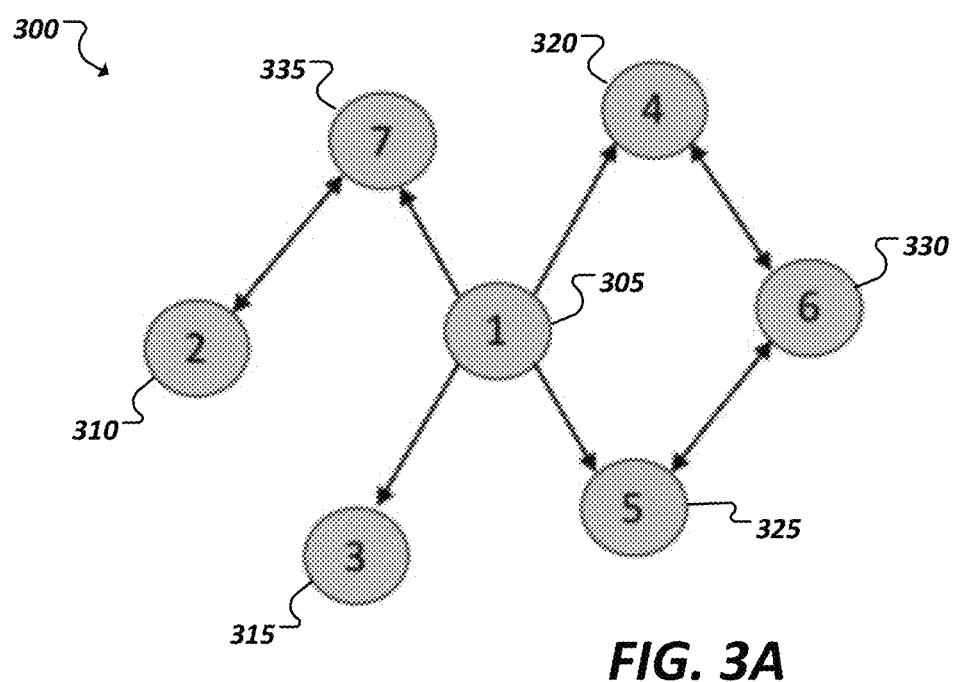
FIG. 3A is a simplified block diagram illustrating a simplified example of a graph structure.
Figure 3B:
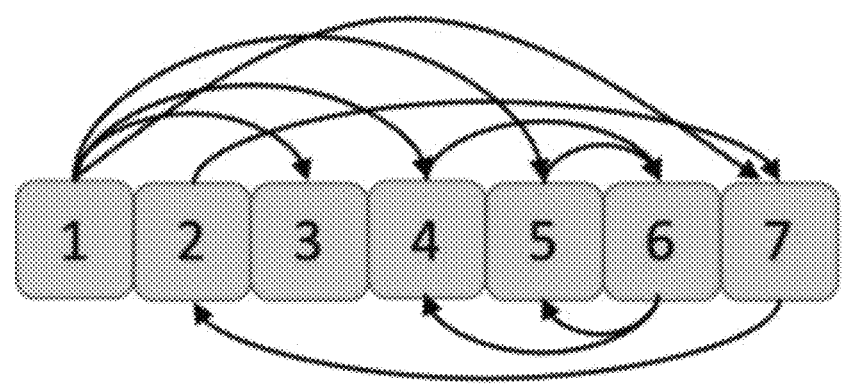
FIG. 3B is a simplified block diagram illustrating a representation of an example access stream using an example graph structure.

FIG. 3A is a simplified representation of an example graph structure 300. The graph structure may be composed of multiple interconnected nodes (e.g., 305, 310, 315, 320, 325, 330, 335). An edge is defined by the interface between one graph node and respective neighboring graph node. Each node may be connected to one or more other nodes in the graph. The sparseness of graph data structures leads to scattered and irregular memory accesses and communication, challenging the decades-long optimizations made in traditional dense compute solutions. As an example, consider the common case of pushing data along the graph edges (e.g., with reference to the simplified graph 300 example of FIG. 3A). All vertices initially store a value locally and then proceed to add their value to all neighbors along outgoing edges. This basic computation is ubiquitous in graph algorithms. FIG. 3B illustrates a representation 350 of an example access stream (e.g., from node 1 (305)), which illustrates the irregularity and lack of locality in such operations, making conventional prefetching and caching effectively useless.

More generally, graph algorithms face several major scalability challenges on traditional CPU and GPU architectures, because of the irregularity and sparsity of graph structures. For instance, in traditional cache-based processor architectures, which utilize prefetching, the execution of graph applications may suffer from inefficient cache and bandwidth utilization. Due to the sparsity of graph structures, caches used in such applications are thrashed with single-use sparse accesses and useless prefetches where most (e.g., 64 byte) memory fetches contain only a small amount (e.g., 8-bytes out of 64) of useful data. Further, overprovisioning memory bandwidth and/or cache space to cope with sparsity is inefficient in terms of power consumption, chip area and I/O pin count.

Further analysis of graph algorithms shows additional problems in optimizing performance. For instance, in the execution of graph algorithms, the computations may be irregular in character—they exhibit skewed compute time distributions, encounter frequent control flow instructions, and perform many memory accesses. For instance, for an example graph-based link analysis algorithm for a search engine, the compute time for a vertex in the algorithm is proportional to the number of outgoing edges (degree) of that vertex. Graphs such as the one illustrated in FIG. 3A may have skewed degree distributions, and thus the work per vertex has a high variance, leading to significant load imbalance. Graph applications may be heavy on branches and memory operations. Furthermore, conditional branches are often data dependent, e.g., checking the degree or certain properties of vertices, leading to irregular and therefore hard to predict branch outcomes. Together with the high cache miss rates caused by the sparse accesses, conventional performance oriented out-of-order processors are largely underutilized: most of the time they are stalled on cache misses, while a large part of the speculative resources is wasted due to branch mispredictions.

As additional example shortcomings of conventional computing architectures' availability to handle graph processing, graph algorithms require frequent fine- and coarse-grained synchronization. For example, fine-grained synchronizations (e.g., atomics) may be required in a graph algorithm to prevent race conditions when pushing values along edges. Synchronization instructions that resolve in the cache hierarchy place a large stress on the cache coherency mechanisms for multi-socket systems, and all synchronizations incur long round-trip latencies on multi-node systems. Additionally, the sparse memory accesses result in even more memory traffic for synchronizations due to false sharing in the cache coherency system. Coarse-grained synchronizations (e.g., system-wide barriers and prefix scans) fence the already-challenging computations in graph algorithms. These synchronizations have diverse uses including resource coordination, dynamic load balancing, and the aggregation of partial results. These synchronizations can dominate execution time on large-scale systems due to high network latencies and imbalanced computation.

Additionally, current commercial graph databases may be quite large (e.g., exceed 20 TB as an in-memory representation). Such large problems may exceed the capabilities of even a rack of computational nodes of any type, which requires a large-scale multi-node platform to even house the graph's working set. When combined with the prior observations—poor memory hierarchy utilization, high control flow changes, frequent memory references, and abundant synchronizations—reducing the latency to access remote data is a challenge, combined with latency hiding techniques in the processing elements, among other example considerations. Traditional architectures and their limitations in being able to effectively handle graph algorithms extends beyond CPUs to include traditional GPU—sparse accesses prevent memory coalescing, branches cause thread divergence and synchronization limits thread progress. While GPUs may have more threads and much higher memory bandwidth, GPUs have limited memory capacity and limited scale-out capabilities, which means that they are unable to process large, multi-TB graphs. Furthermore, where graphs are extremely sparse (<<1% non-zeros), typical GPU memory usage is orders of magnitude less efficient, making GPUs all but unusable outside of the smallest graphs, among other example issues.

An improved computing system architecture may be implemented in computing systems to enable more efficient (e.g., per watt performance) graph analytics. In one example, specialized graph processing cores may be networked together in a low diameter, high radix manner to more efficiently handle graph analytics workloads. The design of such graph processing cores builds on the observations that most graph workloads have abundant parallelism, are memory bound and are not compute intensive. These observations call for many simple pipelines, with multi-threading to hide memory latency. Returning to the discussion of FIG. 2, such graph processing cores may be implemented as multi-threaded cores (MTC), which are round-robin multi-threaded in-order pipeline. In one implementation, at any moment, each thread in an MTC can only have one in-flight instruction, which considerably simplifies the core design for better energy efficiency. Single-threaded cores (STC) are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-or-order pipelines. In some implementations, both MTCs and STCs may implement the same custom RISC instruction set.

Figure 4:
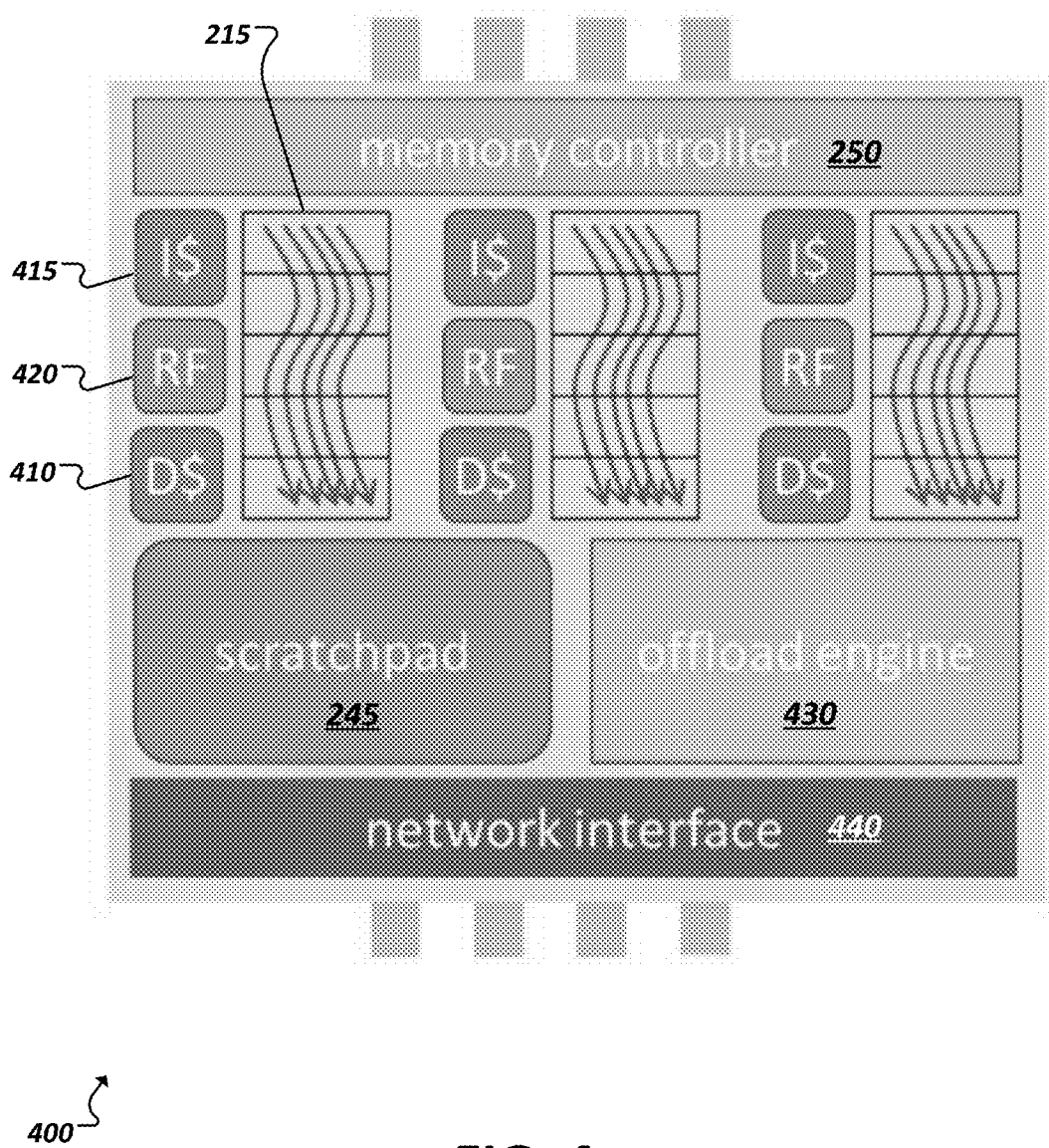
FIG. 4 is a simplified block diagram illustrating example components of an example graph processing core.

Turning to FIG. 4, a simplified block diagram 400 is shown illustrating example components of an example graph processing core device (e.g., 205). A graph processing core device may include a set of multi-threaded cores (MTCs) (e.g., 215). In some instances, both multi-threaded cores and single threaded cores (STCs) may be provided within a graph processing block. Further, each core may have a small data cache (D$) (e.g., 410) and an instruction cache (I$) (e.g., 415), and a register file (RF) (e.g., 420) to support its thread count. Because of the low locality in graph workloads, no higher cache levels need be included, avoiding useless chip area and power consumption of large caches. For scalability, in some implementations, caches are not coherent. In such implementations, programs that are to be executed using the system may be adapted to avoid modifying shared data that is cached, or to flush caches if required for correctness. As noted above, in some implementations, MTCs and STCs are grouped into blocks, each of which may be provided with a large local scratchpad (SPAD) memory 245 for low latency storage. Programs run on such platforms may selecting which memory accesses to cache (e.g., local stack), which to put on SPAD (e.g., often reused data structures or the result of a direct memory access (DMA) gather operation), and which not to store locally. Further, prefetchers may be omitted from such architectures to avoid useless data fetches and to limit power consumption. Instead, some implementations may utilize offload engines or other circuitry to efficiently fetch large chunks of useful data.

Figure 5:
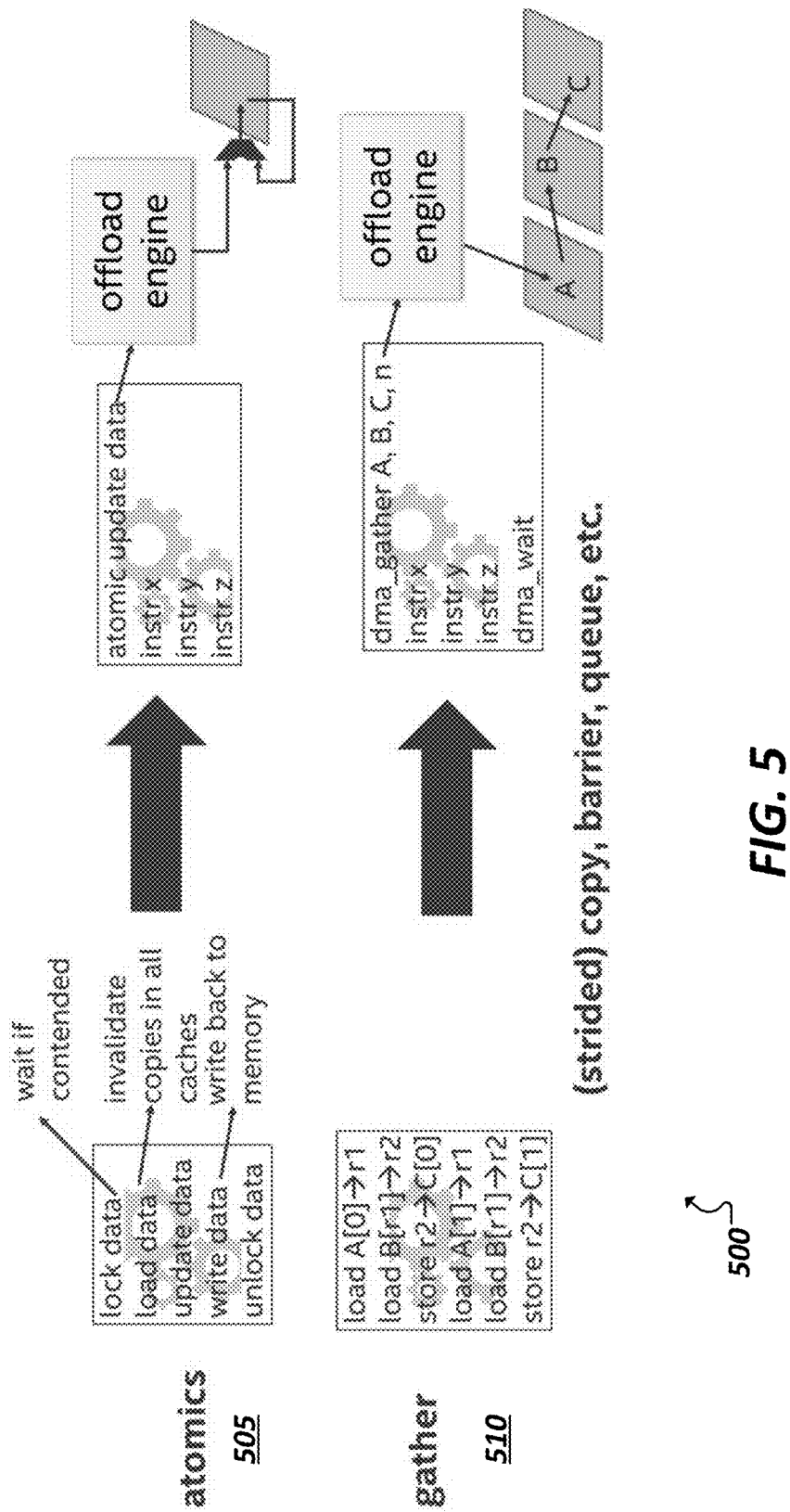
FIG. 5 is a diagram illustrating example operations of an example graphic processing core offload engine.

Continuing with this example, although the MTCs of an example graph processing core hide some of the memory latency by supporting multiple concurrent threads, an MTC may adopt an in-order design, which limits the number of outstanding memory accesses to one per thread. To increase memory-level parallelism and to free more compute cycles to the graph processing core, a memory offload engine (e.g., 430) may be provided for each block. The offload engine performs memory operations typically found in many graph applications in the background, while the cores continue with their computations. Turning to FIG. 5, a simplified block diagram 500 is shown illustrating example operations of an example graphic processing core offload engine (e.g., 430) including atomics 505 and gather operations 510, among other examples. Further, a direct memory access (DMA) engine may perform operations such as (strided) copy, scatter and gather. Queue engines may also be provided, which are responsible for maintaining queues allocated in shared memory, alleviating the core from atomic inserts and removals, among other example benefits. The logic of an offload engine can be used for work stealing algorithms and dynamically partitioning the workload. Further, the offload engines can implement efficient system-wide reductions and barriers. Remote atomics perform atomic operations at the memory controller where the data is located, instead of burdening the pipeline with first locking the data, moving the data to the core, updating it, writing back, and unlocking. They enable efficient and scalable synchronization, which is indispensable for the high thread count in this improved graph-optimized system architecture. The collective logic (or engines) of the offload engines may directed by the graph processing cores using specific instructions defined in an instruction set. These instructions may be non-blocking, enabling the graph processing cores to perform other work while these memory management operations are performed in the background. Custom polling and waiting instructions may also be included within the instruction set architecture (ISA) for use in synchronizing the threads and offloaded computations, among other example features. In some implementations, example graph processing cores and chipsets may not rely on any locality. Instead, the graph processing cores may collectively use their offload engines to perform complex systemwide memory operations in parallel, and only move the data that is eventually needed to the core that requests it. For example, a DMA gather will not move the memory stored indices or addresses of the data elements to gather to the requesting core, but only the requested elements from the data array.

Returning to FIG. 4, an example graph processing device may additionally include a memory controller 250 to access and manage requests of local DRAM. Further, sparse and irregular accesses to a large data structure are typical for graph analysis applications. Therefore, accesses to remote memory should be done with minimal overhead. An improved system architecture, such as introduced above, utilizing specialized graph processing cores adapted for processing graph-centric workload may, in some implementations, implement a hardware distributed global address space (DGAS), which enables respective cores (e.g., graph processing core or support dense core) to uniformly access memory across the full system, which may include multiple nodes (e.g., a multiple graph processing core, corresponding memory, and memory management hardware) with one address space. Accordingly, a network interface (e.g., 440) may be provided to facilitate network connections between processing cores (e.g., on the same or different die, package, board, rack, etc.).

Besides avoiding the overhead of setting up communication for remote accesses, a DGAS also greatly simplifies programming, because there is no implementation difference between accessing local and remote memory. Further, in some implementations, address translation tables (ATT) may be provided, which contain programmable rules to translate application memory addresses to physical locations, to arrange the address space to the need of the application (e.g., address interleaved, block partitioned, etc.). Memory controllers may be provided within the system (e.g., one per block) to natively support relatively small cache lines (e.g., 8 byte accesses, rather than 64 byte accesses), while supporting standard cache line accesses as well. Such components may enable only the data that is actually needed to be fetched, thereby reducing memory bandwidth pressure and utilizing the available bandwidth more efficiently.

The architectural organization described herein is unique when compared with known architectures. More particularly, the architectures disclosed herein have a unique approach to core organization, and accordingly, aspects of the present disclosure describe a novel interrupt controller for efficient control of interrupt handling within each graph processing core (e.g., 205 or 400) of the architectures herein.

An Interrupt Controller Unit (ICU) as described herein may be implemented as a hardware unit located in each graph processing core (e.g., within an offload engine such as 430), and may include a large range of Machine Specific Registers (MSRs). Additionally, in certain embodiments, the ICU may be physically located near MSR blocks of the same core's pipelines (e.g., STP and MTP) to achieve low latency handling of interrupts and exceptions. Programmability of the ICU may be provided via addressable registers (e.g., Machine Specific Register (MSRs)) within the ICU, as well as ISA instructions to provide interrupt and exception handler control to software. As used herein, interrupts may include non-error event notifications, such as a countdown timer saturating or a notification that an instruction sequence is completed, while exceptions may include error conditions, such as a load request having an invalid address, or a divide instruction encountering a divide-by-zero condition.

In certain embodiments, each graph processing core may implement a number (e.g., six) pipelines and a number of threads (e.g., 66) and each graph processing core may include a single ICU that maintains interrupt and exception control configuration and states for all pipelines and threads within the core. This state and configurability may exist within addressable Machine Specific Registers (MSRs), which may be accessible by software. The ICU may include an MSR for each interrupt and exception type defined, which may determine the handler vector and the thread responsible for the handler execution. Table 1 below lists example ICU MSRs that may be implemented by certain embodiments, followed by a more detailed description of certain registers. In Table 1, RW indicates the register is read/write accessible by software, RW/1C indicates the register provides read access to software with a write "1" to clear, and RO indicates the register provides read only access to software.

TABLE 1

Example ICU registers

| Name | Description | Software Access |
|---|---|---|
| Global Interrupt Enable | If set to 1, interrupts have been enabled in the core. If set to 0, interrupts have been disabled | R/W |
| Int0 Interrupt Mask | If set to 1, Int0 interrupt is masked/disabled. If set to 0, Type0 interrupt is unmasked/enabled. | R/W |
| Int0 Interrupt Pending | If set, an Int0 interrupt has been received, and is waiting to be dispatched to the handling thread | R/W |
| Thread Interrupt Status | If set, the thread is busy executing an interrupt handler | RO |
| Thread Exception Status | If set, the thread is busy executing an exception handler | RO |
| Thread Interrupt Mask | If set, any interrupt asserted with the thread as the target handling thread, cannot be delivered and is marked pending | RO |
| Thread Exception Nesting | If set, exception handler nesting is allowed on the thread | RO |
| ICU Exception Status | Contains status bits for error conditions related to the delivery of interrupt or exception handlers | RW/1C |
| Countdown Timer | When set to any value, will decrement by 1 each cycle until 0, at which time a countdown timer interrupt is signaled by the ICU | RW |
| Int0 Interrupt Vector | Contains the vector (start PC) of Int0's interrupt handler. | RW |
| Int0 Interrupt TID | Contains a thread ID, which identifies which thread in the core the Int0 handler is delivered to. | RW |
| Exc0 Exception Vector | Contains the vector (start PC) of Exc0's exception handler | RW |
| Exc0 Exception Target | Determines which thread is the target of the exception handler | RW |
| Exc0 Exception Lock | If set, locks the Exc0 exception type, causing it to be marked pending if one is received | RW |
| Exc0 Exception Invalid Delivery | If set, marks the Exc0 exception type as invalid, causing a double fault if one is received. | RW |
| ICU Output Arbiter Priority | Determines outbound network priority of the ICU | RW |
| Int0 Interrupt MSR Error Status | Set if an Int0 interrupt was received and the Int0 Vector register is programmed incorrectly | RW/1C |
| Int0 Interrupt Dead Target Status | Set if an Int0 interrupt is received, and the target thread to handle it is dead | RW/1C |
| Int0 Interrupt Status | Set if an Int0 interrupt was received | RW/1C |

Global Interrupt Enable: Allows software a way to completely disable interrupts at the core level, regardless of what the interrupt's mask status is set to.

Interrupt Pending: Pending status for each interrupt type. Interrupts collapse into a single pending bit, i.e., if five interrupts are received while the interrupt is masked, only a single pending bit is set. If this bit is set, the handler will be invoked as soon as the target thread is available and the interrupt is unmasked. This can be cleared by SW to prevent a pending interrupt from being invoked.

Thread Interrupt and Exception Status: Each thread in the core has one associated bit in the ICU. This bit is set when the thread has had an interrupt handler sent to it. This bit is cleared when the thread issues an "iret" instruction described below. The exception status bits operate in the same way, but are cleared when the thread issues an "eret" instruction described below.

Thread Exception Nesting: By default, only one exception handler is allowed to execute on a thread at any given time. By issuing an "eopen" instruction described below, software lets the ICU know that nesting of exception handlers is allowed. The "eclose" instruction described below prevents exception nesting.

Interrupt and Exception Vector: Each defined interrupt and exception type has a register that identifies the vector of that handler. This is the program counter (PC) that the target thread begins executing from when the handler is invoked.

Interrupt TID: Interrupts can be configured to be executed by any of the threads in the core. Each interrupt type has a TID register which determines which thread in the core is the target of the interrupt handler for that type.

Exception Target: Exceptions originate a running thread, as such, only limited threads in the core can be responsible for an exception handler. This register has three options for which thread runs the exception handler: the thread which issued the exception, STP0, or STP1.

In certain embodiments, the multi-threaded pipelines (MTPs) or multi-threaded cores (MTCs) described above may employ a hardware thread scheduler that involves some integration of exception and interrupt dispatching with the schedule, and an ICU as described herein can provide dispatching of interrupt and exception handlers. The architecture may define many different error conditions (which may also be referred to as exceptions) and interrupt types, all of which can be programmed by software to have specific threads and entry points to execute the handler. Additionally, an ICU as described herein can include a specific ISA for issuing doorbells and exception handling routines (including support for nested exceptions, in certain embodiments).

Figure 6:
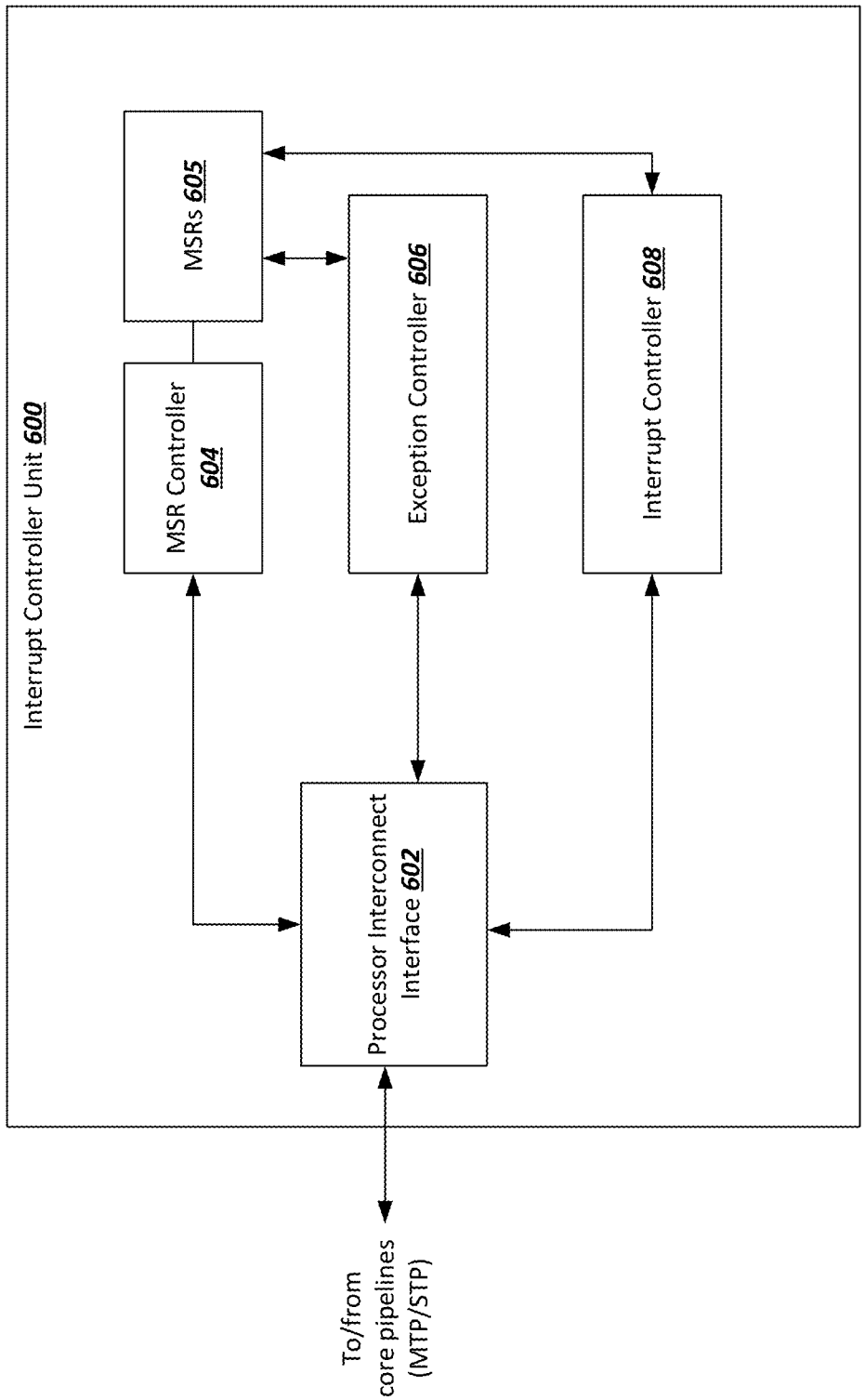
FIG. 6 is a simplified block diagram illustrating an example implementation of an interrupt controller unit.

Turning to FIG. 6, a simplified block diagram of an example implementation of an interrupt controller unit (ICU) 600 is shown. As shown, the ICU design itself may be separated into three logical sub-blocks: an interrupt control block that includes interrupt controller circuitry 608, an exception control block that includes exception controller circuitry 606, and an MSR block that includes MSR controller circuitry 604 and the set of MSRs 605 (which may include the MSRs described above or other types of status or configuration MSRs). In the example shown, there is a single point of entry to the ICU 600 for interrupt and exception notifications through a processor interconnect interface 602. Software can read status MSRs and write to configuration MSRs via the interface 602 and the MSR controller 604. Delivery of interrupt and exception handlers may be similarly provided by the interface 602.

For example, when the ICU 600 receives notification of an interrupt, it may check the MSRs related to the interrupt type. It may first check if interrupts at the core level are enabled (e.g., via the Global Interrupt Enable MSR described above). It may then check if the target thread has enabled interrupts, and that the decoded interrupt type is not masked. If enabled and unmasked, it may then check which thread on the core is designated as that interrupt's handler (e.g., via the Interrupt TID MSR described above), and may then check to see if that thread is currently active (e.g., via a status MSR from core's thread unit) and unmasked. If active and unmasked, the ICU 600 may then access the handler vector from the appropriate interrupt vector register, create a packet to be sent to the target thread to invoke the interrupt on that thread, and update the appropriate status MSR. The packet may be manifested as a single register write of the thread's PC MSR. If any of these conditions are not met (i.e., disabled or masked), then the interrupt may be marked as pending. Pending interrupts can be coalesced into one, so if the ICU receives N number of interrupts of type "0", and those handlers can't be invoked, then only 1 pending bit for that interrupt may be set.

Exception delivery may be similar to the above interrupt delivery process, but with a few modifications. As exceptions are thread level error conditions, the Global Interrupt register is not checked in certain embodiments. An exception hander may be delivered regardless if this bit is set or not. In certain embodiments, an exception may be marked pending only if software "locks" that exception type via Exception Lock MSR bits, or the target thread is already currently executing an exception handler and that thread has not enabled exception nesting.

In certain embodiments, there may exist two unique exception types in the ICU: Double Fault and Triple Fault. A double fault occurs if the ICU is unable to deliver an exception handler (i.e., the target thread is dead). The double fault type is invoked by the ICU itself. If the ICU is unable to deliver the double fault handler, then it flags a triple fault. The triple fault type is considered a system level error and the software may be notified accordingly, e.g., via general purpose input/output (GPIO) signals.

The ICU 600 may dispatch interrupts or exceptions in a given priority. This may be design-dependent and might not be a configuration option. In certain embodiments, exception handlers may be considered highest priority, e.g., an exception handler is itself able to interrupt an already running interrupt handler, but an interrupt handler is never allowed to interrupt a running exception handler. When the exception handler completes, the thread returns to execution of the interrupt handler (if it was executing one). Likewise, interrupts may be unable to interrupt other interrupt handlers.

Several ISA instructions are intended for use by the ICU 600. When a thread issues one of these instructions, it sends an encoded packet to the ICU, along with its own thread ID, which the ICU 600 receives via its interface 602. It decodes the instruction type, and updates the MSRs 605 accordingly. For example, if MTP 2 Thread 4 issued an STI instruction (as described below), the ICU would clear the "Interrupt Mask" MSR for MTP 2 Thread 4. Example ISA instructions are shown in Table 2 below, along with their relevant descriptions.

TABLE 2

Example ISA instructions for an ICU

| Instruction | ASM Form Arguments | Description |
|---|---|---|
| sti | | Enable interrupt handling for the issuing thread |
| cli | | Disable interrupt handling for the issuing thread |
| doorbell | r1, r2, S/N | Interrupt another running thread, r1 = Target thread to doorbell, r2 = PC of doorbell recipient to vector to, S = suspend self on retirement, N = do not suspend self |
| eopen | | Enable exception handling nesting for the issuing thread |
| eclose | | Disable exception handling nesting for the issuing thread |
| eret | | Exception return - signals end of exception handler |

TABLE 2-continued

Example ISA instructions for an ICU

| Instruction | ASM Form Arguments | Description |
|---|---|---|
| iret | | Interrupt return - signals end of interrupt handler | sti: Enables interrupts for the thread issuing it. This instruction sets the associated "Interrupts Enabled" register in the pipeline for the thread, as well as notifies the ICU that this thread has allowed itself to be interrupted. This instruction clears the "Thread Interrupt Mask" MSR.

cli: Disables interrupts for the thread issuing it. This instruction clears the associated "Interrupts Enabled" register in the pipeline for the thread, as well as notifies the ICU that this thread has disallowed itself to be interrupted. This instruction sets the "Thread Interrupt Mask" MSR.

doorbell: A method for one thread to directly interrupt another thread (see below). This instruction is sent to the ICU of the target core, and then the ICU manages dispatching the interrupt to the target thread. This comes in suspend and no-suspend flavors. If suspend type, the issuing thread is suspended, and is expected to be woken up by another thread when required (i.e. by the thread being doorbelled). If not suspended, the thread will continue executing as normal.

eopen: Allows nesting of exception handlers on the issuing thread. When received by the ICU, it sets the "Exception Nesting" bit for the associated thread.

eclose: Dis-allows nesting of exception handlers on the issuing thread. When received by the ICU, it clears the "Exception Nesting" bit for the associated thread.

eret: Signals an end of the exception handler. This is used to have the thread return to executing the normal program, and also alerts the ICU that the thread is no longer executing an exception handler, clearing the "Exception Status" MSR for the associated thread.

iret: Signals an end of the exception handler. This is used to have the thread return to executing the normal program, and also alerts the ICU that the thread is no longer executing an interrupt handler, clearing the "Interrupt Status" MSR for the associated thread.

Figure 7:
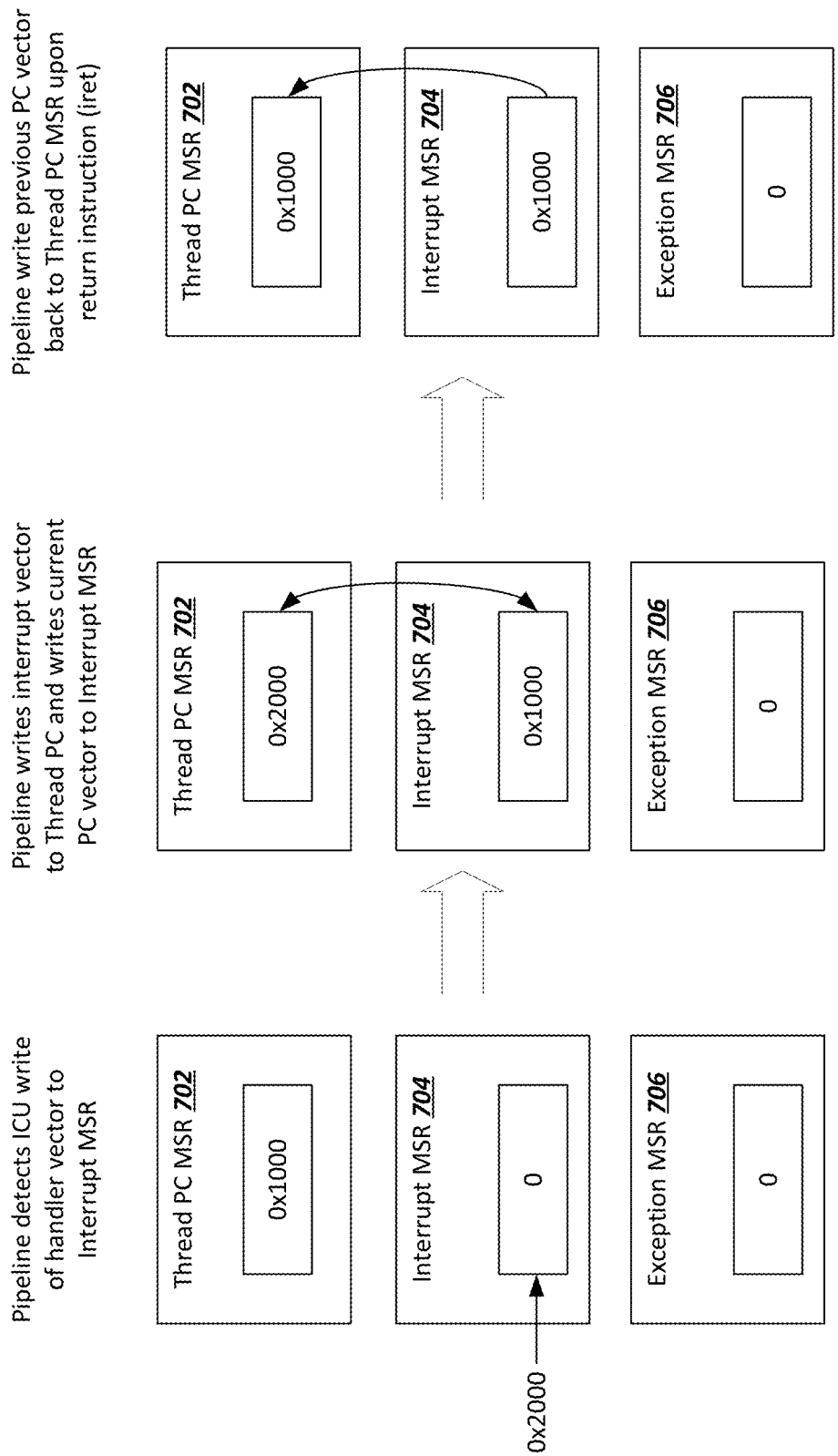
FIG. 7 is a diagram illustrating an example process for invoking an interrupt handler.

Turning to FIG. 7, an example process for invoking an interrupt handler is shown. In certain embodiments, each pipeline of the graph processing core (e.g., the Single Threaded Pipeline or core (STP) or Multi-Threaded Pipeline or core (MTP)) may be designed to work closely with the ICU 600 for the invocation of interrupt and exception handlers. In this way, the pipeline may contain certain MSRs for each thread, including: a Thread PC MSR 702, which includes the program counter (PC) of the current running program, an Interrupt PC MSR 704, which holds the PC to return to upon execution of an "iret" (interrupt return) instruction described above, and an Exception PC MSR 706, which holds the PC to return to upon execution of an "eret" (exception return) instruction described above.

In the example shown in FIG. 7, when the ICU 600 needs to invoke an interrupt handler on a thread, it sends a write to that thread's Interrupt PC MSR 704 with the vector programmed in the ICU for that interrupt type (0x2000 in the example shown). The pipeline's MSR controller detects when a write is occurring to its Interrupt PC MSR 704 and whether the write is coming from the ICU (which is denoted in the incoming packet). If so, the pipeline then stores the value currently in the Thread PC MSR 702 (0x1000 in the example shown) into the Interrupt PC MSR 704, and then writes the value given by the ICU (0x2000) to the Thread PC MSR 702 and sets the thread level Interrupt handler active MSR status bit. This causes the next instruction fetched by the thread to be that of the interrupt handler. Then when the handler is completed (denoted by execution of the "iret" instruction), the thread swaps the Interrupt PC MSR 704 back into the Thread PC MSR 702, causing a return to the normal program.

An exception handler may operate in a similar manner, with the pipeline's MSR controller performing a check for an ICU write to the Exception PC MSR 706, and the swap back occurring on an "eret" instruction. If software enables exception nesting via the "eopen" instruction, software may be responsible for saving the return PC and unrolling the handlers, as the pipelines may only allow an exception handler depth of one in the registers, as shown. Likewise, the pipeline might not automatically perform register storing, so software may be required to save the pipeline's register state to memory inside the handlers.

Since there is some communication latency between the ICU 600 and the pipeline, it is possible a running thread could terminate after the ICU 600 has sent a handler request, but before the pipeline has received it. In such scenarios, the pipeline may detect the attempted handler invocation to the dead thread and send a negative acknowledgement (NACK) back to the ICU 600. The ICU 600 may receive the NACK and then set the "NACK FATAL" interrupt or exception status register, causing a double fault to be flagged by the ICU 600.

In certain embodiments, the ICU 600 may implement a doorbell mechanism, whereby one thread may interrupt another thread to perform instructions. There may be two units that implement the doorbell mechanism: the pipeline (e.g., STP or MTP) and the ICU 600. The pipeline may be responsible for fetching and making the doorbell request, while the ICU may be used to check status and invoke the doorbell on the target thread. The doorbell mechanism may be implemented via the "doorbell" ISA instruction described above. The doorbell instruction may take two register arguments, a thread ID identifier (e.g., an address in a system address map) that identifies which thread to doorbell, and a vector. The vector may be a program counter (PC) or address at which the target thread beings executing from when the doorbell is invoked.

In some embodiments, when a thread issues a doorbell instruction, it forms an instruction packet to be sent to the ICU. It is then routed to the ICU of the target core (since a doorbell can target any core/thread in the system). Once there, the ICU of the target core checks the target thread's status. If it can be delivered, it then sends the doorbell to the target thread via the ICU's interrupt mechanism (e.g., as described above). If it can't be delivered (e.g., because the thread is dead), it will send the response back to the sending pipeline signifying a failure.

The processing of the doorbell in the ICU may be relatively quick, with the bulk of latency occurring in the network walk from the sending core to the target core's ICU (depending on the target core). The ICU may require four cycles to process a doorbell request, with the rest being the network walk from sender to target. A doorbell can take approximately 30 cycles to send a doorbell from one thread to another, for example.

The doorbell instruction may also include a suspend-self or no suspend-self argument, with the two options having different expectations on software. The suspend option may cause the issuing thread to suspend itself after it retires the doorbell instruction. The pipeline will send the doorbell request to the ICU, and if the ICU cannot accept (e.g., its internal buffers are full), it may send a negative acknowledgement (NACK) back to the pipeline. The pipeline then resends the doorbell until the ICU is able to accept it. Software is expected to wake up the thread when needed, either by the doorbelled thread, or another mechanism.

The no suspend-self doesn't suspend the thread on retirement (thus, the issuing thread continues running), but also has a different sending functionality. The pipeline may attempt to send the doorbell only once. If the ICU cannot accept it and NACKs the request, the pipeline will set an MSR called "Doorbell no-suspend FAIL". If the ICU can accept it, it may respond with an acknowledgement and the pipeline will set a "Doorbell no-suspend SUCCESS" MSR. Software can then poll this MSR whenever issuing the no-suspend variant and retry (if desired) if the doorbell fails.

Figure 8:
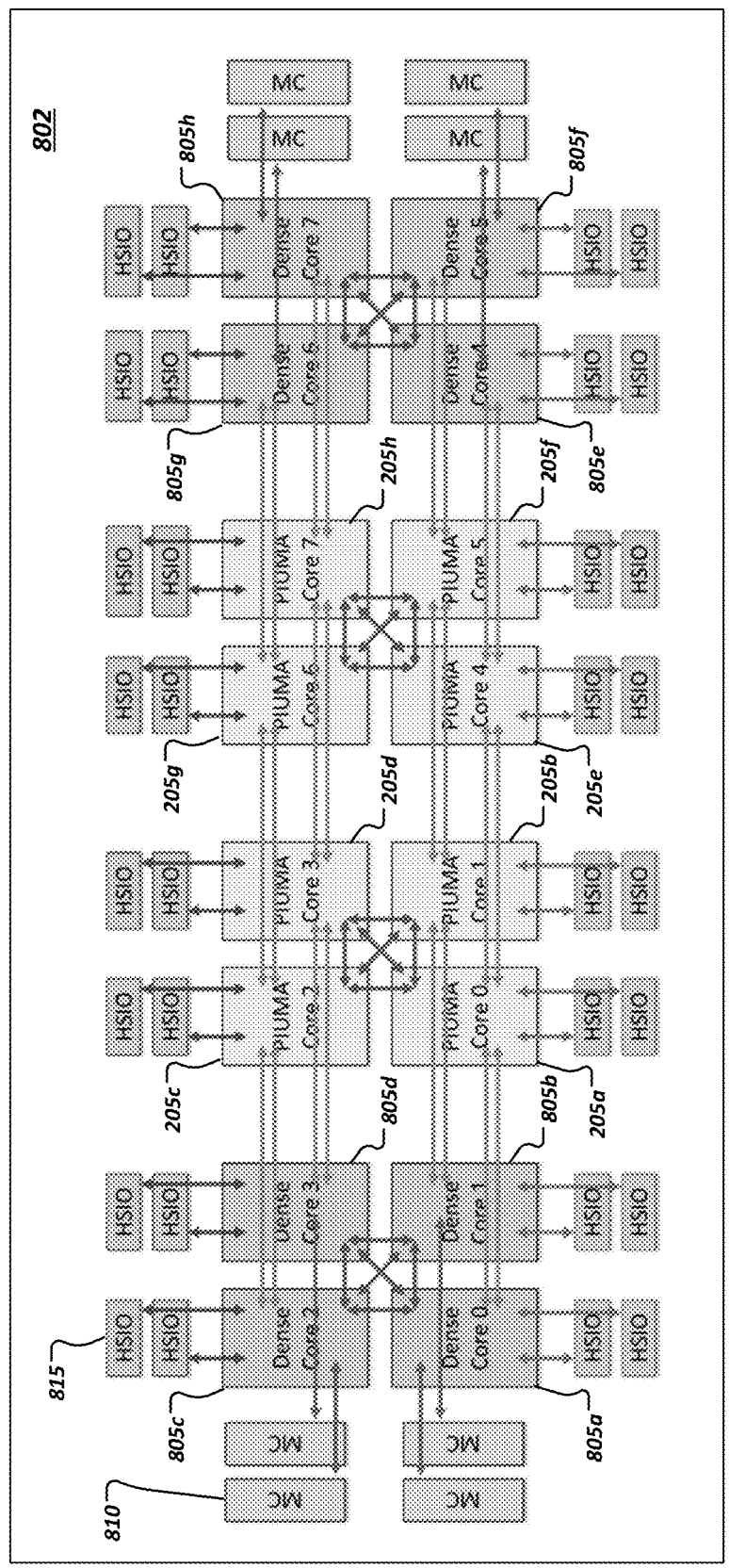
FIG. 8 is a simplified block diagram illustrating an example implementation of a graph processing system including both graph processing cores and dense compute cores.

As noted above, a system, implemented as a chiplet, board, rack, or other platform, may include multiple interconnected graph processing cores, among other hardware elements. FIG. 8 is a simplified block diagram 800 showing an example implementation of a graph processing system 802 including a number of graph processing cores (e.g., 205a-h) each coupled to a high-radix, low-diameter network to interconnect all of the graph processing cores in the system. In this example implementations, the system may further include dense compute cores (e.g., 805a-h) likewise interconnected. In some instances, kernel functions, which would more efficiently be executed using dense compute logic may be offloaded from the graph processing cores to one or more of the dense compute cores. The graph processing cores may include associated memory blocks, which may be exposed to programmers via their own memory maps. Memory controllers (MC) (e.g., 810) may be provided in the system to other memory, including memory external to the system (e.g., on a different die, board, or rack). High speed input/output (HSIO) circuitry (e.g., 815) may also be provided on the system to enable core blocks and devices to couple to other computing devices, such as compute, accelerator, networking, and/or memory devices external to the system, among other examples.

A network may be provided in a system to interconnect the component within the system (e.g., on the same SoC or chiplet die, etc.) and the attributes of the network may be specially configured to support and enhance the graph processing efficiencies of the system. Indeed, the network connecting the blocks is responsible for sending memory requests to remote memory controllers. Similar to the memory controller, it is optimized for small messages (e.g., 8 byte messages). Furthermore, due to the high fraction of remote accesses, network bandwidth may exceed local DRAM bandwidth, which is different from conventional architectures that assume higher local traffic than remote traffic. To obtain high bandwidth and low latency to remote blocks, the network needs a high radix and a low diameter. Various topologies may be utilized to implement such network dimensions and characteristics. In one example, a HyperX topology may be utilized, with all-to-all connections on each level. In some implementations, links on the highest levels are implemented as optical links to ensure power-efficient, high-bandwidth communication. The hierarchical topology and optical links enable the system to efficiently scale out to many nodes, maintaining easy and fast remote access.

Figure 9:
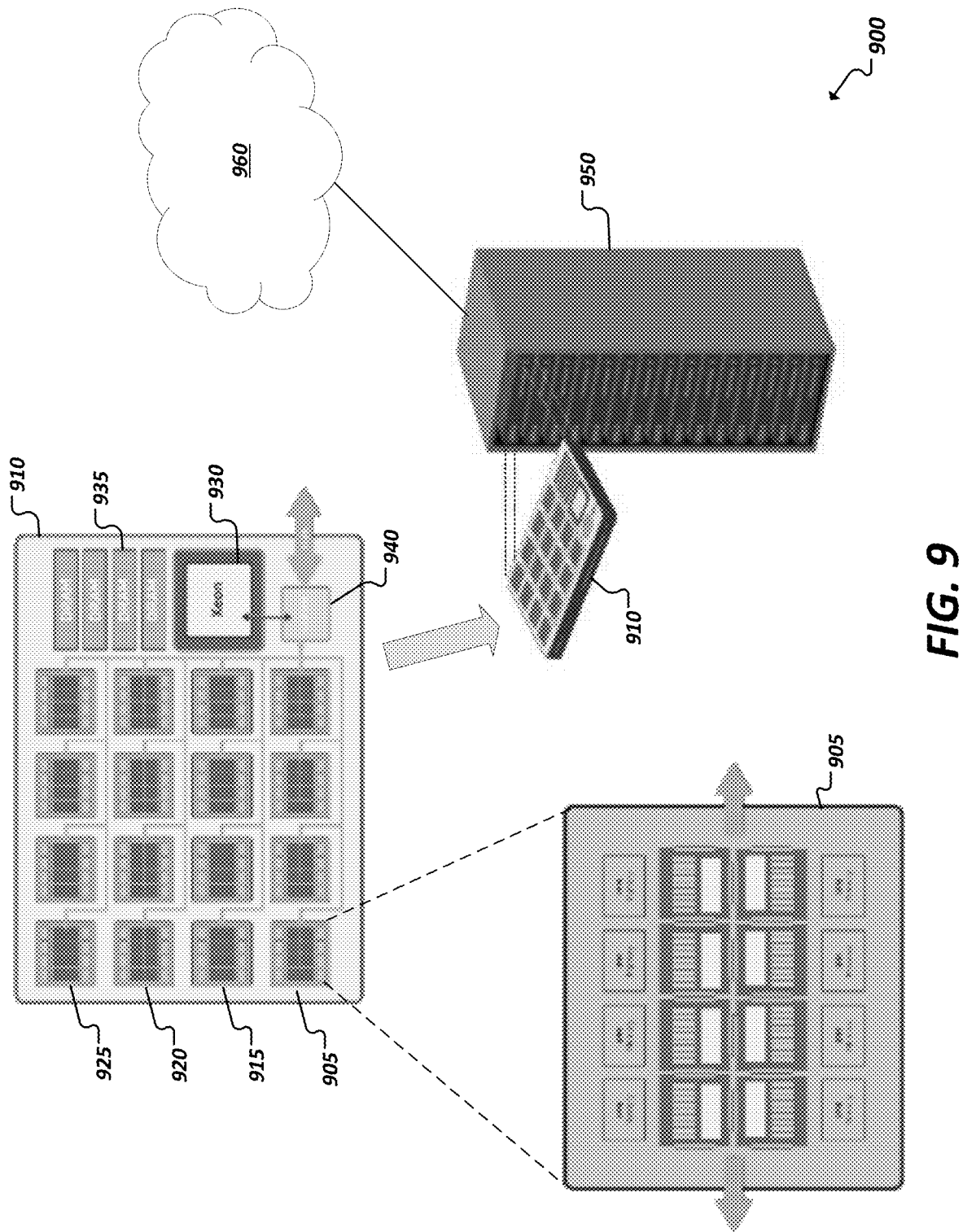
FIG. 9 is a simplified block diagram illustrating an example system including graph processing capabilities.

FIG. 9 is a simplified block diagram showing the use of an example graph processing system (incorporating graph processing cores, such as discussed above) in a server system. A graph processing device (e.g., 905) may be provided with a set of graph processing cores (and in some cases, supplemental dense compute cores). A graph processing device 905 may enable specialized processing support to handle graph workloads with small and irregular memory accesses through near-memory atomics, among other features, such as discussed above. Multiple such graph processing devices (e.g., 905, 915, 920, 925, etc.) may be provided on a board, rack, blade, or other platform (e.g., 910). In some implementations, the platform system 910 may include not only an interconnected network of graph processing devices (and their constituent graph processing cores), but the system 910 may further include general purpose processors (e.g., 930), SoC devices, accelerators, memory elements (e.g., 935), as well additional switches, fabrics, or other circuitry (e.g., 940) to interconnect and facilitate the communication of data between devices (e.g., 905-940) on the platform. The system 910 may adopt a global memory model and be interconnected consistent with the networking and packaging principles described herein to enable high I/O and memory bandwidth.

In some implementations, the system 910 may itself be capable of being further connected to other systems, such as other blade systems in a server rack system (e.g., 950). Multiple systems within the server system 950 may also be equipped with graph processing cores to further scale the graph processing power of a system. Indeed, multiple servers full of such graph processing cores may be connected via a wider area network (e.g., 960) to further scale such systems. The networking of such devices using the proposed graph processing architecture offers networking as a first-class citizen, supports point-to-point messaging, and relies upon a flattened latency hierarchy, among other example features and advantages.

In one example system, a C/C++ compiler (e.g., based on LLVM) may be utilized in the development of software for use with the graph processing systems described herein. For instance, the compiler may support a Reduced Instruction Set Computer (RISC) instruction set architecture (ISA) of the graph processing system, including basic library functions. In some implementations, graph-processing-specific operations, such as the offload engines and remote atomics, are accessible using intrinsics. Additionally, the runtime environment of the system may implement basic memory and thread management, supporting common programming models, such as gather-apply-scatter, task-based and single program, multiple data (SPMD)-style parallelism. Among other tools, an architectural simulator for the graph processing architecture may be provided to simulate the timing of all instructions in the pipelines, engines, memory, and network, based on the hardware specifications. Additional software development tools may be provided to assist developers is developing software for such graph processing systems, such as tools to simulate execution of the software, generate performance estimations of running a workload on the system, performance analysis reports (e.g., CPI stacks and detailed performance information on each memory structure and each instruction), among other example features. Such tools may enable workload owners to quickly detect bottleneck causes, and to use these insights to optimize the workload for graph processing systems.

In some implementations, software developed to perform graph analytics using the improved graph processing architecture discussed herein may be implemented as basic kernels, library overhead may be limited. In networked systems of multiple graph processing cores, the application code does not need to change for multinode execution, thanks to the system-wide shared memory. As an example, a software application may be written to cause the graph processing system to perform a sparse matrix dense vector multiplication (SpMV) algorithm. The basic operation of SpMV may include a multiply-accumulate of sparse matrix elements and a dense vector. A matrix input may be provided (e.g., an RMAT-30 synthetic matrix) stored in compressed sparse row (CSR) format. In one example, a straightforward implementation of SpMV may be programmed, with each thread of the graph processing cores calculating one or more elements of the result vector. The rows are partitioned across the threads based on the number of non-zeros for a balanced execution. It does not make use of DMA operations, and all accesses are non-cached at a default length (e.g., 8-byte), with thread local stack accesses cached by default. Such an implementation may outperform high performance CPU architectures (e.g., Intel Xeon™) through the use of a higher thread count and 8-byte memory accesses, avoiding memory bandwidth saturation. In other implementations of an SpMV algorithm may be programmed to execute on the graph processing architecture utilizing selective caching. For instance, accesses to the matrix values are cached, while the sparse accesses to the vector bypass caches. In the compressed sparse row (CSR) representation of a sparse matrix, all non-zero elements on a row are stored consecutively and accessed sequentially, resulting in spatial locality. The dense vector, on the other hand, is accessed sparsely, because only a few of its elements are needed for the multiply-accumulate (the indices of the non-zeros in the row of the matrix). Accordingly, the accesses to the matrix are cached, while the vector accesses remain uncached 8-byte accesses, leading to a further potential performance improvement relative to CPU architectures. Further, an implementation of the SpMV algorithm may be further enhanced using a graph processing architecture, for instance, by a DMA gather operation to fetch the elements of the dense vector that are needed for the current row from memory. These elements may then be stored on local scratchpad. The multiply-accumulate reduction is then done by the core, fetching the matrix elements from cache and the vector elements from scratchpad. Not only does this significantly reduce the number of load instructions, it also reduces data movement: the index list does not need to be transferred to the requesting core, only the final gathered vector elements. While data is gathered, the thread is stalled, allowing other threads that have already fetched their data to compute a result vector element.

Programs, such as the examples above, may be designed to effectively use the graph processing architecture (e.g., using more than 95% of the available memory bandwidth, while not wasting bandwidth on useless and sparse accesses) and realize potentially exponential efficiency improvement over traditional architectures. Further, the improved graph processing architecture provide much higher thread count support (e.g., 144 threads for Xeon, verses thousands of threads (e.g., 16,000+) in the graph processing core implementation), enabling threads to progress while others are stalled on memory operations, efficient small size local and remote memory operations, and powerful offload engines that allow for more memory/compute overlap. Scaling graph processing systems (e.g., with multiple nodes) may yield compounding benefits (even if not perfectly linear, for instance, due to larger latencies and bandwidth restrictions or other example issues) to significantly outperform other multi-node conventional multinode processor configurations. While the examples focus on an SpMV algorithm, it should be appreciated that this example was offered as but one of many example graph algorithms. Similar programs may be developed to leverage the features of a graph processing architecture to more efficiently perform other graph-based algorithms including application classification, random walks, graph search, Louvain community, TIES sampler, Graph2Vec, Graph Sage, Graph Wave, parallel decoding FST, geolocation, breadth-first search, sparse matrix-sparse vector multiplication (SpMSpV), among other examples.

As noted above, sparse workloads exhibit a large number of random remote memory accesses and have been shown to be heavily network and memory bandwidth-intensive and less dependent on compute capability. While the graph processing architecture discussed herein provides efficient support for workloads that are truly sparse (and may be alternatively referred to as "sparse compute" devices), such a graph processing architecture lacks sufficient compute performance to execute dense kernels (e.g., matrix multiply, convolution, etc.) at needed performance in some applications. Dense kernels are a critical component of many critical compute applications such as image processing. Even with matrix computation units included, a challenge remains of effective integration of dense compute and offloading operations with regards to memory movement, matrix operation definition, and controllability across multiple threads.

Traditional offloading techniques (e.g., for offloading to an on-chip accelerator in an SoC) include memory mapped registers. For instance, the pipeline/core can perform the offload of the computation by writing to memory mapped registers present inside the accelerator. These registers may specify configurations as well as data needed to be used for the computation. This may also require the pipeline to monitor/poll registers if it is not sure that the offload engine is idle. In one example of a graph processing, an enhanced offload mechanism may be used to offload dense compute work from the graph processing cores to dense compute cores. There is a hardware managed queue that stores incoming offload instructions and monitors the current status of the pipeline and launches the instructions sequentially, enabling an easy offload mechanism for the software. Multiple graph processing core threads can each use the dense compute bandwidth of the dense compute cores by calling a new ISA function (e.g., by calling the dense.func) without worrying about the status of the dense core and whether other cores are using the dense core at the same time. The offload instruction can also allow efficient and simple passing of the program counter and operand addresses to one of the dense compute cores as well. The queue gives metrics through software readable registers (e.g., the number of instructions waiting (in a COUNT value)) and can help in tracking average waiting requests and other statistics for any dense core.

As noted above, a graph processing architecture may be particularly suited to operate on sparse workloads exhibiting a large number of random remote memory accesses and that are heavily network and memory bandwidth-intensive and less dependent on compute capability. To efficiently address this workload space, a graph processing architecture has a highly scalable low-diameter and high-radix network and many optimized memory interfaces on each die in the system. While this architectural approach provides efficient support for workloads that are truly sparse, providing a system with graph processing cores alone lacks sufficient compute performance to execute dense kernels (e.g., matrix multiply, convolution, etc.) that may be utilized in some application. To correct this performance gap, some systems incorporating a graph processing architecture may further include dense compute cores in addition to the graph processing cores, such as illustrated in the example of FIG. 8. In this example, eight dense compute cores (e.g., 805*a-h*) are incorporated into each die of a graph processing device (e.g., 802) to be incorporated in a system. In such implementations, kernel functions are offloaded from threads in the graph processing cores (e.g., 205*a-h*) to any dense core 805*a-h* in the system 802 via directed messages.

In one example implementation, the compute capability within each dense core is implemented with a 16×16 reconfigurable spatial array of compute elements or systolic array (also referred to herein as a "dense array (DA)"). In some implementations, the reconfigurable array of compute elements of a dense compute core may be implemented as a multi-dimensional systolic array. This array is capable of a variety of floating point and integer operations of varying precisions. In this example, such an array can, in total, at a 2 GHz operating frequency a single dense core can achieve a peak performance of 1 TFLOP of double precision FMAs. Respective dense cores may have a control pipeline responsible for configuring the DA, executing DMA operations to efficiently move data into local buffers, and moving data into and out of the DA to execute the dense computation. The specific characteristics (e.g., memory locations, compute types, and data input sizes) of the operations vary based on the corresponding kernel. These kernels are programmed by software and launched on the control pipeline at a desired program counter (PC) value.

In some implementations, graph processing cores within a system that also include dense compute cores may include a dense offload queue and corresponding hardware circuitry to perform offloads from the graph processing core to the dense compute core control. This offload pipeline is managed intelligently by hardware managed through the dense offload queues (DOQ) to thereby simplify programmability for the software offloading the dense compute. With full hardware management, there is no need for software to check for the idleness of the dense compute or having to manage the contents and ordering of the queue, among other example benefits. The hardware circuitry managing the DOQs may also handle passing of the required program counter (PC) information, the operand, and the result matrix addresses to the control pipeline in a simple manner, among other example features.

In some implementations, a specialized instruction in the graph processing architecture ISA may be provided as a handle for initiating a request to a dense compute core. For instance, the software may use a dense function ISA instruction (e.g., 'dense.func') to trigger the offloading of a task from a graph processing core to a dense compute core by sending an instruction packet over the network interconnecting the cores from the graph processing core to one of the dense compute cores. The request may include the address of the target dense compute core, which may be used by the network to route the packet to the appropriate dense compute core. The request packet may be received at the dense offload queue (DOQ) corresponding to the targeted dense compute core.

Figure 10:
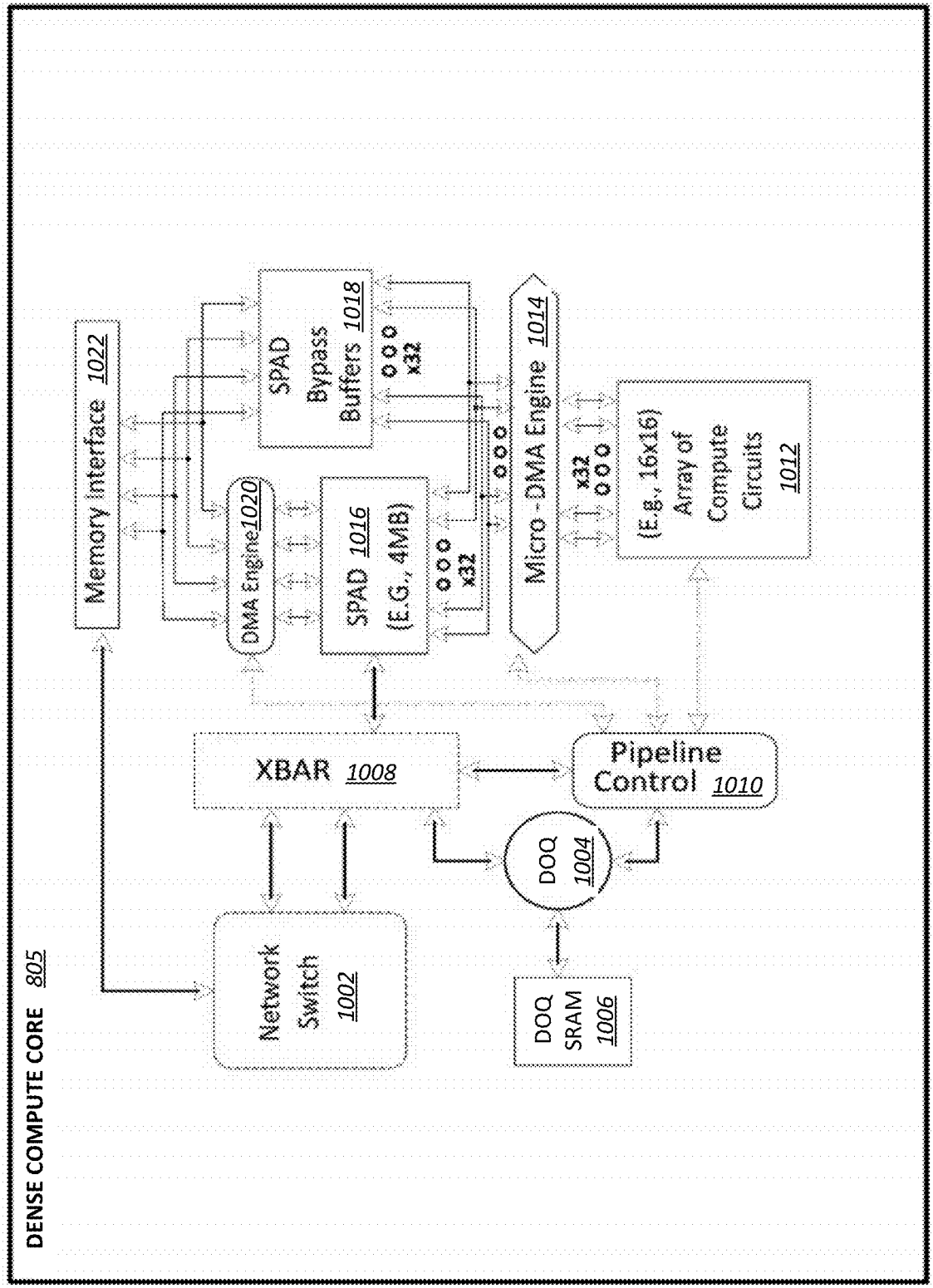
FIG. 10 is a simplified block diagram illustrating an example dense compute core.

Turning to FIG. 10, a simplified block diagram is shown illustrating an example dense compute core 805. Dense compute cores (e.g., 805) may include an array 1012 of interconnected compute units, which provide the dense computing functionality of the dense compute core. In some examples, a 16×16 array of compute elements may be provided. A dense compute core 805, in one example implementation, may also include a dense offload queue 1004 and control pipeline 1010 and crossbar (XBAR) 1008 to support the movement of data between the dense compute core and other components of the system (e.g., graph processing cores, memory controllers and associated blocks of shared memory, other dense compute cores, etc.). Logic for executing a dense offload instruction may be implemented as a decoder circuit and/or an execution circuit (e.g., execution unit) in the dense offload queue, the control pipeline, or other components of the dense compute core. Various instructions may be received for a dense computing core at its dense offload queue (e.g., 1004).

In some implementations, control pipeline 1010 may be implemented as a single-threaded pipeline for managing and orchestrating hardware of the dense compute core 805 for performing various functions. For instance, control pipeline 1010 may configure the reconfigurable array of compute elements 1012 in one of a variety of possible configurations, read data from local or remote memory (e.g., through DMA calls to shared memory), copy/write such data to local scratchpad memory 1016 of the dense compute core for use by the array 1012, load instructions corresponding to a set of functions, instructions, kernel, or other program (e.g., based on a program counter value) for execution by compute units in the array, move result data (e.g., data generated during execution of the dense workload offloaded to the dense core) from the dense compute core (e.g., from scratchpad (e.g., 1016) to memory accessible to a graph processing core (e.g., through a remote atomic), update registers identifying progress of the workload execution by the array of compute circuits, among other example tasks and functions.

Dense offload queue 1004 may be utilized to provide hardware-managed orchestration and monitoring of workloads offloaded to the corresponding dense compute core 805 (e.g., from a sparse-compute graph processing core). The dense offload queue 1004 may maintain a hardware-based queue of received instructions, may identify when the control pipeline 1010 (and compute array 1012) are available to handle a next instruction in the queue, and monitor the status of the control pipeline and performance of functions associated with an offload request. In this manner, the dense offload queue 1004 may simplify software development for platforms incorporating a mix of sparse graph processing cores and dense processing cores by implementing the orchestration and monitoring of offloaded dense compute tasks in hardware. For instance, a single instruction (e.g., a dense offload instruction (e.g., dense.func)) may be defined in the ISA of the platform to simply and elegantly allow hardware to manage offloading of tasks and the performance of these tasks by a corresponding dense compute core (e.g., 805). The dense offload queue 1004 can cause or launch action by the control pipeline 1010 including the performance of actions using in crossbar 1008, DMA engine 1020, and/or micro-DMA engine 1014 to appropriately configure the dense compute core hardware to perform a set of particular tasks, kernel, or other program. In certain embodiments, memory interface 1022 is coupled to a (e.g., system) memory, e.g., shared memory external from the dense compute core 805. In certain embodiments, other components (e.g., core(s)) are coupled to core 805 via network switch 1002, such as other dense compute cores and graph processing cores, among other example elements.

In certain embodiments, a micro-DMA engine 1014 is coupled to the array of compute circuits 1012, a scratch pad memory 1016 (e.g., memory address accessible), and/or a buffer 1018 (e.g., not memory address accessible) that bypasses the SPAD. In one embodiment, local scratchpad (SPAD) 1016 is used to hold data that is subject to high reuse and bypass SPAD buffer 1018 is used for low-reuse to reduce offload latency. Thirty-two parallel input/output ports are used as an example, and it should be understood that other numbers of ports may be utilized, e.g., 64, 128, etc. In certain embodiments, micro-DMA engine 1014 is not coupled to memory external to core 805 and/or is not part of a cache coherency hierarchy.

In some implementations, the array of compute circuits 1012 of a dense compute core is implemented as a multi-element (e.g., 16 element×16 element) reconfigurable spatial array of compute circuits (e.g., a dense array (DA)) capable of a variety of floating point and integer operations of varying precisions (e.g., a grid of floating-point unit (FPU) and/or arithmetic-logic unit (ALU) blocks). The reconfigurability of the array of compute circuits 1012 allows for multiple options for connectivity between its internal compute circuits. In certain embodiments, the connectivity is pre-configured in the array of compute circuits 212 before (e.g., kernel) execution begins. Embodiments herein utilize a reconfigurable array of compute circuits because (i) given optimal array configuration, it provides high compute efficiency for a subset of kernels under a variety of input and output matrix sizes, and the programmability of the DA (e.g., via the μDMA instructions) seamlessly integrates into an ISA (e.g., an ISA for the second core type) with minimal control pipeline modifications, among other example features and benefits.

The dense offload queue 1004 manages incoming dense function requests passed from graph processing cores in a system. For instance, when a dense function request is received, the DOQ 1004 will store it in its local memory buffer (DOQ SRAM 1006). Whenever the control pipeline 1010 has completed execution of the previous kernel and becomes free (or immediately if its already free), the DOQ 1004 pops the function from its queue and launches the corresponding thread on the control pipeline 1010. Accordingly, in some implementations, the DOQ 1004 is responsible for both queue pointer management in the dense compute core, as well as serializing and launching the dense functions in the order that they were received and monitoring the status of the control pipeline 1010 to determine when they need to be popped off the queue. Further, the DOG 1004 can load the matrix addresses passed along with a dense functional instruction call (e.g., dense.func) into the register file of the control pipeline 1010 and thus enables the control pipeline ease of access to this data, among other example functions.

Table 3 shows the structure of one example implementation of a dense function (dense.func) instruction:

TABLE 3

Example dense.func instruction description

| Instruction | ASM Form Arguments | Argument Descriptions |
| --- | --- | --- |
| dense.func | r1, r2, r3, r4, r5 | r1 = start PC; r2 = Matrix A address; r3 = Matrix B address; r4 = Matrix C address; r5 = Target dense core address |

Figure 11:
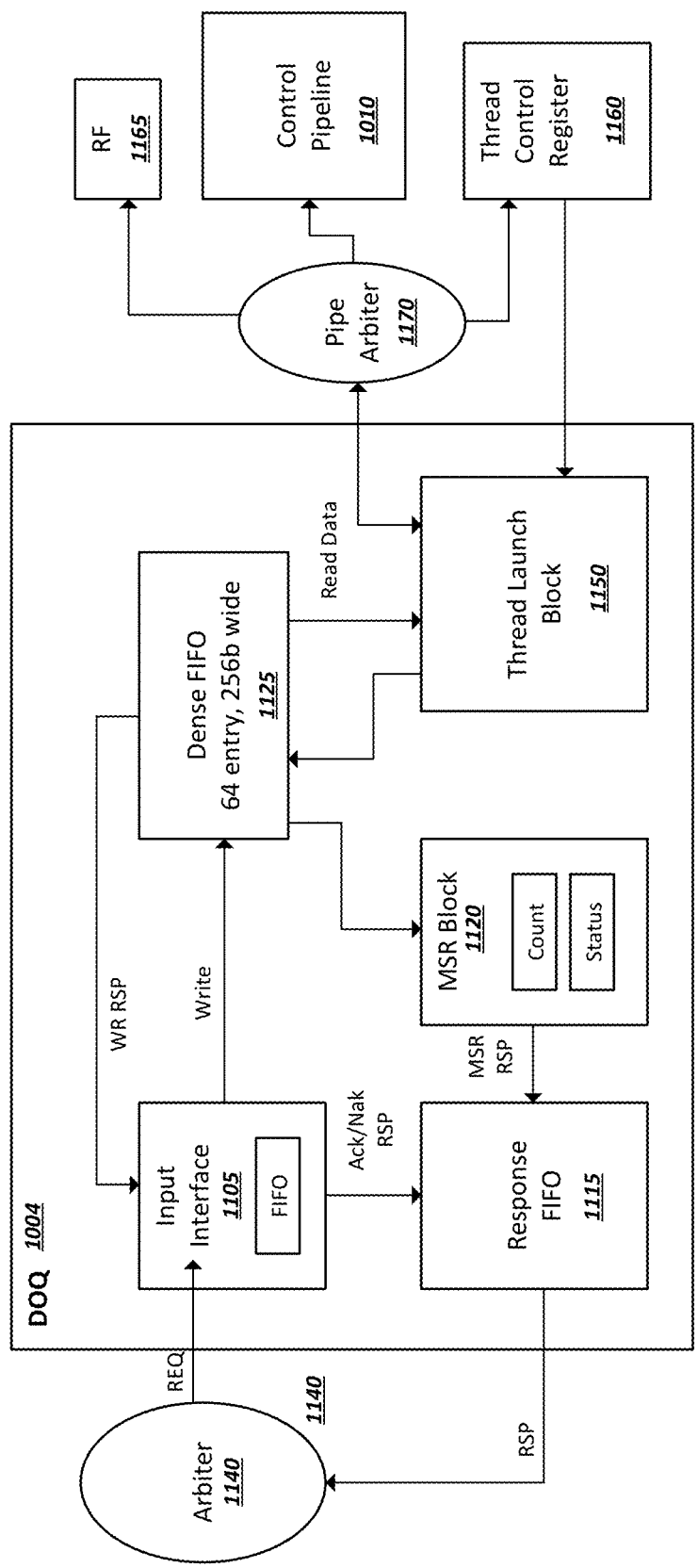
FIG. 11 is a simplified block diagram illustrating an example dense offload queue associated with a dense compute core.

In the example instruction illustrated in Table 3:
- r1—Starting PC of the kernel. This value is passed to the control pipeline 1010 when execution begins.
- r2—Base address for input matrix A. The control pipeline 1010 will use this when copying data from off-die memory to the dense core's local scratchpad (e.g., 1016).
- r3—Base address for input matrix B. The control pipeline 1010 will use this when copying data from off-die memory to the dense core's local scratchpad 1016.
- r4—Base address for output matrix C. The control pipeline 1010 will use this when copying data from the dense core's local scratchpad 1016 to off die memory or other memory outside the dense compute core.
- r5—Address of the dense core that is to execute the dense function FIG. 11 is a simplified block diagram 1100 illustrating the example microarchitecture of an example dense offload queue 1004, as may be utilized in some implementations. An input arbiter block 1140 may be provided that receives instructions passed to a corresponding dense compute core on a network coupling the dense compute core to other dense compute cores as well as graph processing cores on the platform. The arbitrator block 1140 may pass the relevant instructions (that utilize the DOQ) to the DOQ. The DOQ 1004 may include an input interface unit 1105, which include input flops and an input first-in-first-out (FIFO) queue (e.g., to absorb received requests in instances of stalling or backpressure). In one example, the input FIFO may be four entries deep, although other implementations may utilize queues of different depths. The input interface unit 1105 may check for the correct opcode and send a negative acknowledgment (NACK) if the opcode does not match dense.func. The dense offload queue 1004 may further include, in some implementations, a response FIFO queue 1115 and machine specific register (MSR) block 1120, which includes two write ports: one from MSR block and another from input interface for ACK/NACK responses. The response FIFO queue 1115 may queue and send ACK/NAK responses to the requesting graph processing core to communicate to the requesting graph processing core that its instruction has/has not been accepted. In the event the instruction is negatively acknowledged, the graph processing core may attempt a different instruction or attempt to offload a workload through the instruction to another dense compute core, among other examples.

Continuing with the example of FIG. 11, The dense offload queue 1004 may additionally include a dense instruction FIFO 1125, which serves as the hardware queue for queuing offload instructions received for the dense compute core. In one implementation, if the dense instruction FIFO 1125 is not full and the input FIFO is not empty, then the input interface unit 1105 sends write requests to the dense instruction FIFO 1125. If the dense instruction FIFO 1125 is full then the input interface unit 1105 refrains from sending any more write requests to the dense instruction FIFO 1125 until the queue is at least partially cleared. The input interface unit 1105 may receive a response from the dense instruction FIFO 1125 once the data has been stored, and forwards it to response FIFO 1115 as an instruction response (e.g., for forwarding to the requesting graph processing core). An input "FIFO full" signal may be defined as a backpressure signal to the input arbiter block 1140 to not accept any more instructions. For instance, when the input FIFO is full, it may create a NACK-retry response packet to be sent through the response FIFO 1115, in some implementations.

In some examples, the dense instruction FIFO 1125 may be implemented as a static random access memory (SRAM)-based FIFO that is 64 deep and 256 bits wide. This dense instruction FIFO 1125 receives the instruction from the input interface unit 1105. It sends the data to a thread launch block 1150 when the queue is not empty and the control pipeline 1010 is in a thread IDLE state. Due to its depth (in this example), the dense instruction FIFO 1125 can hold a maximum of 64 instructions in flight. Accordingly, the DOQ 1004 may be equipped with functionality to allow the DOQ 1004 to check the status of the control pipeline 1010 to know if a thread is currently active. For instance, this can be tracked and observed by a "Thread 0 FULL" bit in a thread control register 1160. In some implementations, to optimize performance, the DOQ 1004 can monitor thread activity by monitoring this thread control register value directly, for instance, as a single wire from the MSR block 1120. When it is determined that the control pipeline 1010 is free, the thread launch block 1150 can pull data from the dense FIFO queue 1125 and cause a corresponding program to be launched by the control pipeline 1010 by writing initial values to the register file 1165 used by the control pipeline 1010 and sending additional data through a pipeline arbiter block 1170 for use by the control pipeline 1010 in accessing instructions corresponding to the functions identified in the offloaded workload, configuring the dense compute core array, loading the appropriate operand data in local scratchpad of the dense compute core array, and directing the movement of data and execution of instructions in accordance with performance of the functions by the dense compute array.

In some implementations, machine specific registers (MSRs) (e.g., in MSR block 1120) may include one or more registers to identify (e.g., to software and/or other compute blocks of a platform) the status of the queue maintained by the DOQ 1004, as well as the status of functions launched by the DOQ 1004. In one example, the MSRs may include one or more status registers and one or more count registers. Given that the DOQ 1004 manages a single queue of a set size (e.g., 64 entries), there may be no need for configuration of address and size, simplifying the registers in MSR block 1120. In one example, the MSR status register may be utilized to record and identify the status of the single queue buffer that is managed by the dense offload queue 1004. Bit fields in this register may include "full", "empty", and exception information. A Count register may be utilized to identify the number of elements currently in the queue. If this value is non-zero, the thread launch block will know to send the information to the control pipeline to launch the thread, among other examples.

Once the DOQ 1004 detects that the control pipeline 1010 is idle and the queue has a valid instruction waiting, the DOQ 1004 uses the instruction information to launch the thread on the control pipeline. Accordingly, the DOQ 1004 may begin by pulling the oldest instruction off of the tail of the dense FIFO queue and update the internal FIFO/queue pointers accordingly. The DOQ 1004 may then issue a store operation of the Matrix A Address into the control pipeline register file (e.g., an 8 Byte store into R1), as well as issue a store operation of the Matrix B Address into the control pipeline register file (e.g., an 8 Byte store into R2) and a store operation of the Matrix C Address into the control pipeline register file (e.g., an 8 Byte store into R3). The DOQ 1004 may additionally issue a store operation of the Start Program Counter (PC) value to the control pipeline thread 0 program counter MSR (e.g., an 8B store) to identify the first instruction to be executed in a set of instructions or functions embodying the workload to be performed by the dense compute core. The DOQ 1004 may then issue a store operation to set the FULL and ENABLE MSR bits in the control pipeline MSR space to kick start the thread. Once these stores are all successful, the thread has been launched and the DOQ's role has concluded for that specific instruction. The DOQ 1004 should now return to monitoring the idle status of the control pipeline for launching the next dense.func (if an instruction is waiting on the queue) on the control pipeline. Once an offload instruction is received and queued (or launched) by the DOQ, the DOQ may send an acknowledgement response, such as discussed above.

Figure 12:
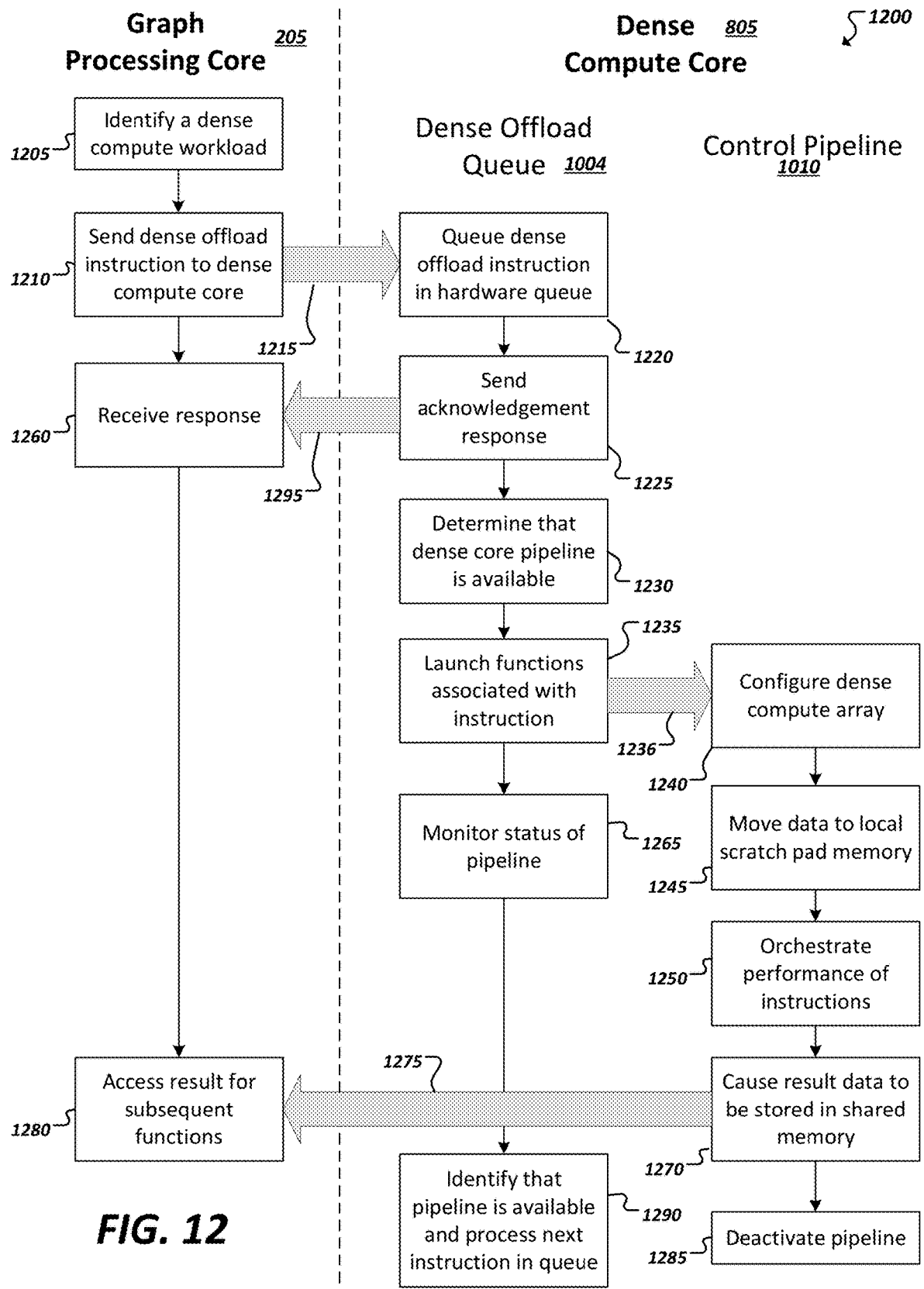
FIG. 12 is a simplified flow diagram illustrating a simplified flow diagram illustrating example flows involved in the offloading of functions from a graph processing core.

A dense offload queue (DOQ) may implement a hardware-based state machine and queue to enable offloading of tasks from graph processing cores to dense compute cores simply and efficiently and with minimal status monitoring my software. The DOQ may manage the queue of offload instructions received at a given dense compute core and launch corresponding threads at the hardware level, allowing software to simply utilize a dense offload function call (e.g., dense.func) and information provided through DOQ MSRs, rather than more granular management of dense compute core usage. FIG. 12 is a simplified flow diagram 1200 illustrating example flows involved in the offloading of functions from a graph processing core (e.g., 205) to a particular dense compute core 805 communicatively coupled within a network (e.g., a high-radix, low diameter network implemented on or between dies).

A graph processing core 205 may identify 1205 one or more functions in an algorithm (being executed by the graph processing core) that involve dense compute functions. Given the sparse compute architecture of the graph processing core 205 to simplify the software model through the provision of a specialized ISA instruction (e.g., dense.func), which the software may call to trigger the use of this hardware-implemented queue (e.g., the DOQ). In response to identifying the dense workload, the graph processing core 205 may send 1210 a dense offload instruction (e.g., 1215) over the network to a particular dense processing core (e.g., 805). As multiple dense compute cores may be accessible to the graph processing core over the network, the graph processing core (e.g., utilizing one or more of its single-threaded pipelines) may determine (e.g., from a register or table maintained in software), which dense compute core(s) are available and have bandwidth to assist in handling this dense compute workload. Accordingly, the graph processing core may identify the particular dense compute core as a candidate and address the instruction 1215 accordingly.

A dense offload queue (DOQ) 1004 may queue 1220 offload instructions (and potentially other instructions) received on the network. As discussed above, the DOG 1004 may monitor the status of the dense core control pipeline to determine the availability of dense compute resources. In some implementations, upon queuing a received instruction (e.g., 1220), the DOQ 1004 may send 1225 a response (e.g., 1295) back to the requesting graph processing core 205 to acknowledge (e.g., 1255) the instruction. In other implementations, an additional or alternative response may be sent based on the launch of functions corresponding to the instructions, among other example implementations. The queue maintained by the DOQ may be FIFO in that, as the dense compute core finished performing a workload corresponding to the earliest received offload instruction, the DOQ may cause the next received offload instruction to be launched (e.g., 1235) upon determining 1230 that the control pipeline is available (e.g., finished with the preceding instruction's workload). Accordingly, the DOQ 1004 may message 1236 the control pipeline 1010 to reactivate the control pipeline and provide the control pipeline with the information included in the next received instruction (e.g., 1215). The control pipeline 1010 may use this information and launch performance of the corresponding functions by configuring 1240 the dense compute array, moving data 1245 to the local scratchpad of the dense compute core (e.g., from shared memory via DMA calls), and identify the set of functions corresponding to the workload and orchestrate the performance of these functions using the dense compute core's resources (e.g., compute array, scratchpad, local memory, etc.).

After launching 1235 the functions, the DOQ 1004 may additionally monitor 1265 the status of the control pipeline 1010 to the determine whether the performance of the corresponding functions is complete. This may be identified through a register associated with the control pipeline. In some implementations, the pipeline may deactivate following completion of the functions to indicate its availability and status of the functions, among other example implementations. The control pipeline 1010 may also orchestrate the delivery of results or outputs (e.g., 1275) generated from performance of the function(s) by causing 1270 result data to be written to shared memory or other memory accessible to the requesting graph processing core. The graph processing core may access 1280 the result data and utilize these results (in some implementations) in the performance of subsequent sparse compute functions associated with a graph analytic algorithm performed using the graph processing core(s). In some implementations, software may cause a program or algorithm to be parallelized by splitting the workload across multiple graph processing cores and/or dense processing cores. For instance, in one example, a result generated by a dense compute core may be accessed and utilized by another graph processing core, other than the graph processing core that requested the corresponding workload offload, among other examples. In some cases, offloaded functions may be blocking functions, while in other instances, the offloaded functions may be performed in parallel with other functions performed by the requesting graph processing core. Indeed, the platform utilizing both graph processing cores and dense compute cores may be highly flexible in its applications and the programs that may be crafted to perform various graph-based algorithms in efficient and optimized ways.

As noted above, a DOQ may monitor 1265 the status of the control pipeline and determine 1290 when the control pipeline has completed directing the performance of a given workload and is available to be reactivated again to launch a next workload associated with a next offload instruction in the DOQ queue. Indeed, upon identifying the availability of the control pipeline 1010, the DOQ 1004 may pop the next instruction off the queue and repeat the flow by again launching functions associated with this next instruction and so on in accordance with the programs being run on the platform.

"Logic" (e.g., as found in offload engines, memory managers, memory controllers, network controllers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification.

Example 1 is an apparatus (e.g., a graph processing core) comprising: a plurality of processing pipelines, each processing pipeline to execute one or more threads and comprising, for each thread, a first register to hold a value indicating a currently executing program counter (PC) vector, and a second register to hold a value indicating an interrupt handler vector or an exception handler vector; and an interrupt controller unit comprising circuitry to: receive interrupt or exception notifications from the processing pipelines; determine a handler vector based on the notification and a set of registers of the interrupt controller unit; and transmit the handler vector to the processing pipeline that issued the interrupt or exception notification; wherein each processing pipeline comprises circuitry to: receive the handler vector from the interrupt controller unit; write a value in the first register into the second register; and write the handler vector into the first register.

Example 2 includes the subject matter of Example 1, wherein the circuitry of each processing pipeline is to invoke an interrupt or exception handler based on the hander vector written into the first register.

Example 3 includes the subject matter of Example 1 or 2, wherein the circuitry of each processing pipeline is to write a value in the second register back into the first register based on issuing a return instruction.

Example 4 includes the subject matter of any one of Examples 1-3, wherein each processing pipeline comprises, for each thread, a register to hold a value indicating an interrupt handler vector and another register to indicate an exception handler vector.

Example 5 includes the subject matter of any one of Examples 1-4, wherein the interrupt controller comprises a set of registers corresponding to each respective interrupt and exception type whose value indicates a handler vector corresponding to the interrupt or exception type, and the interrupt controller unit circuitry is to determine the handler vector from a register corresponding to an interrupt or exception type indicated in the notification received from the issuing pipeline.

Example 6 includes the subject matter of any one of Examples 1-5, wherein the interrupt controller unit circuitry is further to update a status register of the interrupt controller unit corresponding to a target thread of the interrupt or exception based on transmitting the handler vector.

Example 7 includes the subject matter of any one of Examples 1-6, wherein the interrupt controller unit circuitry is further to: determine whether interrupts are enabled for the apparatus based on a register of the interrupt controller unit indicating an interrupt enablement status for all threads; and transmit the handler vector to the issuing pipeline based on a determination that the register indicates that interrupts are enabled for all threads.

Example 8 includes the subject matter of any one of Examples 1-7, wherein the interrupt controller unit circuitry is further to: determine whether a target thread of the interrupt or exception notification is active and unmasked based on a register of the interrupt controller unit corresponding to the interrupt or exception type indicated in the notification; and transmit the handler vector to the issuing pipeline based on the thread being active and unmasked.

Example 9 includes the subject matter of any one of Examples 1-8, wherein the interrupt controller unit comprises interrupt controller circuitry to process interrupt notifications from the processing pipelines, exception controller circuitry to process exception notifications from the processing pipelines, and register controller circuitry to process requests to read or write to registers of the interrupt controller unit.

Example 10 includes the subject matter of Example 9, wherein the interrupt controller unit further comprises an interface to receive notifications from the processing pipelines and direct notifications to one of the interrupt controller circuitry, the exception controller circuitry, and the register controller circuitry.

Example 11 is a system comprising: a set of one or more dense compute cores; and a set of one or more graph processing cores, wherein the set of graph processing cores and the set of dense compute cores are interconnected in a network, and each graph processing core comprises a set of one or more single threaded pipelines (STPs), a set of one or more multi-threaded pipelines (MTPs), and an interrupt controller unit, each STP and MTP comprising, for each thread, a first register to hold a value indicating a currently executing program counter (PC) vector, and a second register to hold a value indicating an interrupt handler vector or an exception handler vector, wherein: the interrupt controller unit comprises circuitry is to: receive an interrupt or exception notification from an issuing pipeline; determine a handler vector based on the notification and a set of registers of the interrupt controller unit; and transmit the handler vector to the issuing pipeline; and the issuing pipeline comprises circuitry to: receive the handler vector from the interrupt controller unit; write a value in a first register into the second register; and write the handler vector into the first register.

Example 12 includes the subject matter of Example 11, wherein the circuitry of the STPs and MTPs are to invoke an interrupt or exception handler based on the hander vector written into the first register, and write a value in the second register back into the first register based on issuing a return instruction.

Example 13 includes the subject matter of any one of Examples 11-12, wherein the STPs and MTPs each comprise, for each thread of the respective pipeline, a register to hold a value indicating an interrupt handler vector and another register to indicate an exception handler vector.

Example 14 includes the subject matter of any one of Examples 11-13, wherein the interrupt controller unit circuitry is to determine the handler vector from a register corresponding to an interrupt or exception type indicated in the notification received from the issuing pipeline.

Example 15 includes the subject matter of any one of Examples 11-14, wherein the interrupt controller unit comprises interrupt controller circuitry to process interrupt notifications from the STPs and MTPs, exception controller circuitry to process exception notifications from the STPs and MTPs, and register controller circuitry to process requests to read or write to registers of the interrupt controller unit.

Example 16 includes the subject matter of Example 15, wherein the interrupt controller unit further comprises an interface to receive notifications from the processing pipelines and direct notifications to one of the interrupt controller circuitry, the exception controller circuitry, and the register controller circuitry.

Example 17 includes the subject matter of any one of Examples 11-16, wherein one or more of the set of graph processing cores are resident on a same die with the one or more of the set of graph processing cores.

Example 18 includes the subject matter of any one of Examples 11-17, wherein each of the set of graph processing cores is optimized for sparse computations associated with graph-based data structures.

Example 19 includes the subject matter of any one of Examples 11-18, wherein the network comprises a high radix, low diameter network.

Example 20 includes the subject matter of any one of Examples 11-19, wherein the dense compute cores and graph processing cores are connected to other dense compute cores and graph processing cores in a server rack system.

Example 21 is a method to be implemented by a graph processing core, the method comprising: receiving, at an interrupt controller unit of the graph processing core, an interrupt or exception notification from a processing pipeline of the graph processing core; determining a handler vector for the interrupt or exception based on a lookup in a set of registers of the interrupt controller unit; writing a value in a first register of the processing pipeline into a second register of the processing pipeline, the first register indicating a vector of a next process for execution by the processing pipeline; writing the handler vector into the first register of the processing pipeline; and invoking, by the processing pipeline, an interrupt or exception hander based on the value written into the first register.

Example 22 includes the subject matter of Example 21, further comprising writing a value in the second register back into the first register based on the processing pipeline issuing a return instruction after execution of the interrupt or exception handler.

Example 23 includes the subject matter of Example 21 or 22, further comprising determining the handler vector from a register of the interrupt controller unit corresponding to an interrupt or exception type indicated in the notification received from the processing pipeline.

Example 24 includes the subject matter of any one of Examples 21-23, further comprising updating a status register of the interrupt controller unit corresponding to a target thread of the interrupt or exception based on transmitting the handler vector.

Example 25 includes an apparatus comprising means to implement any one of Examples 21-24.

Example 26 includes machine-readable media embodying instructions that, when executed by a machine, cause the machine to implement any one of Examples 21-24.

Example 27 is an apparatus comprising: a plurality of processing pipelines to execute one or more threads; an interrupt controller unit comprising: a plurality of addressable registers, comprising: one or more software programmable registers; registers corresponding to respective interrupt or exception types, the registers identifying a handler vector for the interrupt or exception type; and circuitry to: configure certain of the addressable registers based on instructions executed by the plurality of processing pipelines; and provide a handler vector to the processing pipelines based on interrupt or exception notifications.

Example 28 includes the subject matter of Example 27, wherein the circuitry is to configure certain of the software programmable registers to enable or disable interrupt or exception handling by the interrupt controller unit based on a handling enable/disable instruction executed by a thread of the processing pipeline.

Example 29 includes the subject matter of Example 28, wherein the instruction is to enable or disable interrupt or exception handling for the particular thread of the processing pipeline that executed the instruction.

Example 30 includes the subject matter of Example 27, wherein the circuitry is to configure certain of the software programmable registers to enable or disable exception nesting for a particular thread based on a nesting enable/disable instruction executed by the particular thread.

Example 31 includes the subject matter of any one of Examples 27-30, wherein: each processing pipeline comprises, for each thread, a first register to hold a value indicating a currently executing program counter (PC) vector, and a second register to hold a value indicating an interrupt handler vector or an exception handler vector; and the interrupt controller unit circuitry is to: receive interrupt or exception notifications from the processing pipelines; determine a handler vector based on the notification and registers of the interrupt controller unit; and transmit the handler vector to the processing pipeline that issued the interrupt or exception notification; wherein each processing pipeline further comprises circuitry to: receive the handler vector from the interrupt controller unit; write a value in the first register into the second register; and write the handler vector into the first register.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a plurality of processing pipelines, each processing pipeline to execute one or more threads and comprising, for each thread, a first register to hold a value indicating a currently executing program counter (PC) vector, and a second register to hold a value indicating an interrupt handler vector or an exception handler vector; and
an interrupt controller unit comprising circuitry to:
receive interrupt or exception notifications from the processing pipelines;
determine a handler vector based on the notification and registers of the interrupt controller unit; and
transmit the handler vector to the processing pipeline that issued the interrupt or exception notification;
wherein each processing pipeline comprises circuitry to:
receive the handler vector from the interrupt controller unit;
write a value in the first register into the second register; and
write the handler vector into the first register.

2. The apparatus of claim 1, wherein the circuitry of each processing pipeline is to invoke an interrupt or exception handler based on the handler vector written into the first register.

3. The apparatus of claim 1, wherein the circuitry of each processing pipeline is to write a value in the second register back into the first register based on issuing a return instruction.

4. The apparatus of claim 1, wherein each processing pipeline comprises, for each thread, a register to hold a value indicating an interrupt handler vector and another register to indicate an exception handler vector.

5. The apparatus of claim 1, wherein the interrupt controller comprises registers corresponding to each respective interrupt and exception type whose value indicates a handler vector corresponding to the interrupt or exception type, and the interrupt controller unit circuitry is to determine the handler vector from a register corresponding to an interrupt or exception type indicated in the notification received from the issuing pipeline.

6. The apparatus of claim 1, wherein the interrupt controller unit circuitry is further to update a status register of the interrupt controller unit corresponding to a target thread of the interrupt or exception based on transmitting the handler vector.

7. The apparatus of claim 1, wherein the interrupt controller unit circuitry is further to:
determine whether interrupts are enabled for the apparatus based on a register of the interrupt controller unit indicating an interrupt enablement status for all threads; and
transmit the handler vector to the issuing pipeline based on a determination that the register indicates that interrupts are enabled for all threads.

8. The apparatus of claim 1, wherein the interrupt controller unit circuitry is further to:
determine whether a target thread of the interrupt or exception notification is active and unmasked based on a register of the interrupt controller unit corresponding to an interrupt or exception type indicated in the notification; and
transmit the handler vector to the issuing pipeline based on the thread being active and unmasked.

9. The apparatus of claim 1, wherein the interrupt controller unit comprises interrupt controller circuitry to process interrupt notifications from the processing pipelines, exception controller circuitry to process exception notifications from the processing pipelines, and register controller circuitry to process requests to read or write to registers of the interrupt controller unit.

10. The apparatus of claim 9, wherein the interrupt controller unit further comprises an interface to receive notifications from the processing pipelines and direct notifications to one of the interrupt controller circuitry, the exception controller circuitry, and the register controller circuitry.

11. A system comprising:
one or more dense compute cores; and
one or more graph processing cores, wherein the graph processing cores and the dense compute cores are interconnected in a network, and each graph processing core comprises a one or more single threaded pipelines (STPs), one or more multi-threaded pipelines (MTPs), and an interrupt controller unit, each STP and MTP comprising, for each thread, a first register to hold a value indicating a currently executing program counter (PC) vector, and a second register to hold a value indicating an interrupt handler vector or an exception handler vector, wherein:
the interrupt controller unit comprises circuitry is to:
receive an interrupt or exception notification from an issuing pipeline;
determine a handler vector based on the notification and of registers of the interrupt controller unit; and
transmit the handler vector to the issuing pipeline; and
the issuing pipeline comprises circuitry to:
receive the handler vector from the interrupt controller unit;
write a value in a first register into the second register; and
write the handler vector into the first register.

12. The system of claim 11, wherein the circuitry of the STPs and MTPs are to invoke an interrupt or exception handler based on the handler vector written into the first register, and write a value in the second register back into the first register based on issuing a return instruction.

13. The system of claim 11, wherein one or more of the graph processing cores are resident on a same die with the one or more of the graph processing cores.

14. The system of claim 11, wherein each of the graph processing cores is optimized for sparse computations associated with graph-based data structures.

15. The system of claim 11, wherein the network comprises a high radix, low diameter network.

16. The system of claim 11, wherein the dense compute cores and graph processing cores are connected to other dense compute cores and graph processing cores in a server rack system.

17. A method to be implemented by a graph processing core, the method comprising:
receiving, at an interrupt controller unit of the graph processing core, an interrupt or exception notification from a processing pipeline of the graph processing core;
determining a handler vector for the interrupt or exception based on a lookup in one or more registers of the interrupt controller unit;
writing a value in a first register of the processing pipeline into a second register of the processing pipeline, the first register indicating a vector of a next process for execution by the processing pipeline;
writing the handler vector into the first register of the processing pipeline; and invoking, by the processing pipeline, an interrupt or exception hander based on the value written into the first register.

18. The method of claim 17, further comprising writing a value in the second register back into the first register based on the processing pipeline issuing a return instruction after execution of the interrupt or exception handler.

19. The method of claim 17, further comprising determining the handler vector from a register of the interrupt controller unit corresponding to an interrupt or exception type indicated in the notification received from the processing pipeline.

20. The method of claim 17, further comprising updating a status register of the interrupt controller unit corresponding to a target thread of the interrupt or exception based on transmitting the handler vector.

21. An apparatus comprising:
a plurality of processing pipelines to execute one or more threads;
an interrupt controller unit comprising:
a plurality of addressable registers, comprising:
one or more software programmable registers to store configuration information for the interrupt controller unit;
registers corresponding to respective interrupt or exception types, the registers storing information identifying a handler vector for the interrupt or exception type; and
circuitry to:
configure certain of the addressable registers based on instructions executed by the plurality of processing pipelines;
configure certain of the software programmable registers to enable or disable interrupt or exception handling by the interrupt controller unit based on a handling enable/disable instruction executed by a thread of the processing pipeline; and
provide a handler vector to the processing pipelines based on interrupt or exception notifications.

22. The apparatus of claim 21, wherein the instruction is to enable or disable interrupt or exception handling for a particular thread of the processing pipeline that executed the instruction.

23. The apparatus of claim 21, wherein the circuitry is to configure certain of the software programmable registers to enable or disable exception nesting for a particular thread based on a nesting enable/disable instruction executed by the particular thread.

* * * * *